US009158689B2

(12) United States Patent
Solihin

(10) Patent No.: US 9,158,689 B2
(45) Date of Patent: Oct. 13, 2015

(54) AGGREGATING CACHE EVICTION NOTIFICATIONS TO A DIRECTORY

(71) Applicant: Empire Technology Development LLC, Wilmington, DE (US)

(72) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 175 days.

(21) Appl. No.: 13/982,607

(22) PCT Filed: Feb. 11, 2013

(86) PCT No.: PCT/US2013/025522
§ 371 (c)(1),
(2) Date: Jul. 30, 2013

(87) PCT Pub. No.: WO2014/123542
PCT Pub. Date: Aug. 14, 2014

(65) Prior Publication Data
US 2014/0229680 A1    Aug. 14, 2014

(51) Int. Cl.
*G06F 12/08* (2006.01)

(52) U.S. Cl.
CPC .......... *G06F 12/082* (2013.01); *G06F 12/0817* (2013.01)

(58) Field of Classification Search
CPC ................ G06F 12/0817; G06F 12/082
See application file for complete search history.

(56) References Cited

U.S. PATENT DOCUMENTS

| 4,322,795 A | 3/1982 | Lange et al. |
| 4,885,680 A | 12/1989 | Anthony et al. |
| 6,421,766 B1 | 7/2002 | Jones, Jr. |
| 6,691,297 B1 | 2/2004 | Misaka et al. |
| 6,704,843 B1 | 3/2004 | Arimilli et al. |
| 6,920,532 B2 | 7/2005 | Glasco et al. |
| 6,996,676 B2 | 2/2006 | Megiddo et al. |
| 7,334,089 B2 | 2/2008 | Glasco et al. |
| 7,953,932 B2 | 5/2011 | Shum et al. |
| 8,341,358 B1 * | 12/2012 | Edmondson et al. ......... 711/144 |
| 8,407,421 B2 | 3/2013 | Steely, Jr. et al. |
| 8,463,825 B1 * | 6/2013 | Harty et al. ................... 707/813 |
| 9,053,057 B2 | 6/2015 | Solihin |
| 2005/0251626 A1 | 11/2005 | Glasco |

(Continued)

OTHER PUBLICATIONS

Chaudhuri, M., "Page NUCA: Selected Policies for Page-grain Locality Management in Large Shared Chip-multiprocessor Caches," IEEE 15th International Symposium on High Performance Computer Architecture, pp. 227-238, (Feb. 14, 2009).

(Continued)

*Primary Examiner* — Idriss N Alrobaye
*Assistant Examiner* — Ronald Modo
(74) *Attorney, Agent, or Firm* — Turk IP Law, LLC

(57) ABSTRACT

Technologies are described herein generally relate to aggregation of cache eviction notifications to a directory. Some example technologies may be utilized to update an aggregation table to reflect evictions of a plurality of blocks from a plurality of block addresses of at least one cache memory. An aggregate message can be generated, where the message specifies the evictions of the plurality of blocks as reflected in the aggregation table. The aggregate message can be sent to the directory. The directory can parse the aggregate message and update a plurality of directory entries to reflect the evictions from the cache memory as specified in the aggregate message.

33 Claims, 14 Drawing Sheets

(56) References Cited

U.S. PATENT DOCUMENTS

| | | | |
|---|---|---|---|
| 2007/0180196 A1 | 8/2007 | Gutherie et al. | |
| 2008/0104331 A1 | 5/2008 | Handgen | |
| 2008/0235456 A1* | 9/2008 | Kornegay et al. | 711/130 |
| 2009/0216947 A1 | 8/2009 | Bohn et al. | |
| 2009/0300288 A1* | 12/2009 | Lefebvre et al. | 711/128 |
| 2010/0268912 A1* | 10/2010 | Conte et al. | 712/20 |
| 2010/0318527 A1* | 12/2010 | Nandy et al. | 707/754 |
| 2011/0276762 A1 | 11/2011 | Daly et al. | |
| 2011/0320558 A1* | 12/2011 | Gross et al. | 709/213 |
| 2012/0137059 A1 | 5/2012 | Yang et al. | |
| 2012/0137061 A1 | 5/2012 | Yang et al. | |
| 2012/0144098 A1 | 6/2012 | Yang et al. | |

OTHER PUBLICATIONS

International Search Report and Written Opinion for application with application No. PCT/US12/55502, dated Jan. 25, 2013, 143 pages.

Lee, H., "Fault- and Yield-Aware On-Chip Memory Design and Management," Ph.D. dissertation, University of Pittsburgh, pp. 1-112. (Apr. 13, 2011).

Borkar, Shekhar, Andrew A. Chien, "The Future of Microprocessors", Communications of the ACM, vol. 54, No. 5, pp. 67-77, May 2011.

Conway, P., Kalyanasundharam, N., Donley, G.; Lepak, K.; Hughes, B.; "Cache Hierarchy and Memory Subsystem of the AMD Opteron Processor", Micro, IEEE, vol. 30, Issue 2, Mar. 2010.

Bardisa, Alberto Ros, "Efficient and Scalable Cache Coherence for Many-Core Chip Multiprocessors", Universidad De Murcia, Jul. 2009.

International Search Report and Written Opinion for PCT Application No. PCT/US2013/025522 mailed Apr. 23, 2013.

* cited by examiner

| EVICTED BLOCK ADDRESS 202 | SIZE OF EVICTION MESSAGE(S) 204 | | |
|---|---|---|---|
| | TRADITIONAL DIRECTORY ONE BLOCK/MESSAGE 206 | MESSAGE AGGREGATION BITMAP FORMAT 208 | MESSAGE AGGREGATION POINTER FORMAT 210 |
| 4C5FA7A03 | 4.5B | 214 ⌒ 4C5FA7A0 + 216 ⌒ 1001001000011000 | 214 ⌒ 4C5FA7A0 + 218 ⌒ 3 + 4 + 9 + C + F |
| 4C5FA7A04 | 4.5B | | |
| 4C5FA7A09 | 4.5B | | |
| 4C5FA7A0C | 4.5B | | |
| 4C5FA7A0F | 4.5B | | |
| TOTAL | 22.5B  212 | 6B  220 | 6.5B  222 |

*FIGURE 2*

| x | Pop(x) | x/lg(x) | WHICH FORMAT? |
|---|---|---|---|
| 16 | 7 | 16/4 = 4 | BITMAP |
| 32 | 7 | 32/5 = 6.4 | BITMAP |
| 64 | 14 | 64/6 = 10.7 | BITMAP |

FIGURE 10

| x, y | Pop(y) | c/pop(x) + (x-y)/8 | WHICH GRANULARITY? |
|---|---|---|---|
| 32, 16 | 7 | 4/7 + (32-16)/8 = 2.57 | 16-BLOCK REGION |
| 64, 16 | 7 | 4/14 + (64-16)/8 = 6.29 | 16-BLOCK REGION |

FIGURE 11

AGGREGATING CACHE EVICTION NOTIFICATIONS TO A DIRECTORY

CROSS-REFERENCE TO RELATED APPLICATION

This Application is a U.S. national stage filing under 35 U.S.C. 371 of International Application No. PCT/US2013/025522, filed on Feb. 11, 2013.

BACKGROUND

Unless otherwise indicated herein, the materials described in this section are not prior art to the claims in this application and are not admitted to be prior art by inclusion in this section.

Many computing devices utilize multicore chips to execute various instructions provided by operating systems and/or application programs. With continued technology scaling, the number of processor cores that can be integrated on a single multicore chip continues to follow the trend described by Moore's Law. Multicore technology has entered an era in which threshold voltage can no longer be scaled down without exponentially increasing the static power consumption incurred due to leakage current. This results in a phenomenon called the "power wall," "utility wall," or "dark silicon," in which an increasing fraction of the chip cannot be powered at full frequency or powered-on at all. A way to improve performance in future multicore chips, therefore, is to improve energy efficiency.

SUMMARY

Technologies described herein generally relate to aggregation of cache eviction notifications to a directory. The described technologies may be embodied in many ways, including but not limited to systems, methods, devices, and computer-readable mediums.

Some example methods are described that aggregate cache eviction notifications to a directory in a multicore chip. Example methods may update an aggregation table to reflect evictions of a plurality of blocks from a plurality of block addresses of at least one cache memory. Example methods may generate an aggregate message configured to specify the evictions of the plurality of blocks as reflected in the aggregation table. Example methods may send the aggregate message to the directory. The directory may be configured to parse the aggregate message and to update a plurality of directory entries to reflect the evictions from the cache memory as specified in the aggregate message.

Some example multicore chips are described that include a plurality of cores. At least one cache memory may be coupled to the plurality cores. A directory and a directory controller may be coupled to the directory. An aggregation table may include a plurality of entries. A control logic may be configured to update the aggregation table to reflect evictions of a plurality of blocks from a plurality of block addresses of the cache memory. The control logic may also be configured to generate an aggregate message, where the message specifies the evictions of the plurality of blocks as reflected in the aggregation table. The control logic may further be configured to send the aggregate message to the directory controller. The directory controller may be configured to parse the aggregate message and to update a plurality of directory entries in the directory to reflect the evictions from the at least one cache memory as specified in the aggregate message.

Some example computer-readable media are described that may include computer-executable instructions stored thereon which, when executed by a computer, cause the computer to perform one or more operations. Some example operations may include detection of first evictions of a first plurality of clean blocks from a first plurality of sequential block addresses of a cache memory in a multicore chip. Example operations may include detection of second evictions of a second plurality of clean blocks from a second plurality of sequential block addresses of the cache memory. Example operations may include an update of a first entry in an aggregation table in the multicore chip to reflect the first evictions of the first plurality of clean blocks. Example operations may include an update of a second entry in the aggregation table in the multicore chip to reflect the second evictions of the second plurality of clean blocks. The first entry may correspond to the first plurality of sequential block addresses. The second entry may correspond to the second plurality of sequential block addresses. The control logic may also be configured to generate a first aggregate message configured to specify the first evictions of the first plurality of clean blocks as reflected in the first entry of the aggregation table and to generate a second aggregate message configured to specify the second evictions of the second plurality of clean blocks as reflected in the second entry of the aggregation table. The control logic may also be configured to send the first aggregate message and the second aggregate message to a directory controller coupled to a directory in the multicore chip. The directory controller may be configured to parse the first aggregate message and the second aggregate message, to update a first plurality of directory entries in the directory to reflect the first evictions from the cache memory as specified in the first aggregate message, and to update a second plurality of directory entries in the directory to reflect the second evictions from the cache memory as specified in the second aggregate message.

Some example methods are described that handle cache evictions. Example methods may determine that a block is to be evicted from a cache memory. Example methods may determine whether the block is a dirty block. Example methods may notify a cache coherence directory of an eviction of the block as a dirty block, in response to determining that the block is a dirty block. Example methods may determine whether an aggregation table contains an entry corresponding to a block address of the block, in response to determining that the block is not a dirty block. Example methods may create an entry in the aggregation table corresponding to the block address of the block and update the entry to reflect an eviction of the block from the cache memory as a clean block, in response to determining that the aggregation table does not contain an entry corresponding to the block address of the block. Example methods may update the entry to reflect an eviction of the block from the cache memory as a clean block, in response to determining that the aggregation table does contain an entry corresponding to the block address of the block.

The foregoing Summary is illustrative only and is not intended to be in any way limiting. In addition to the illustrative aspects, embodiments, and features described above, further aspects, embodiments, and features will become apparent by reference to the Figures and the following Detailed Description.

BRIEF DESCRIPTION OF THE FIGURES

The foregoing and other features of this disclosure will become more fully apparent from the following Detailed Description, accompanying Figures, and appended claims. Understanding that these Figures depict only several embodiments in accordance with the disclosure and are, therefore, not to be considered limiting of its scope, the disclosure will be described with additional specificity and detail with reference to the accompanying Figures, in which:

FIG. 2 is a table illustrating an example comparison among the size of per-block eviction notification messages in a traditional directory protocol, an aggregated eviction notification message in a bitmap format, and an aggregated eviction notification message in a pointer format;

FIG. 10 is a table illustrating sample computations for use in determining whether to use a bitmap format or a pointer format;

FIG. 11 is a table illustrating sample computations for use in determining which aggregation granularity unit conserves traffic the most in a particular situation;

Figure 1:
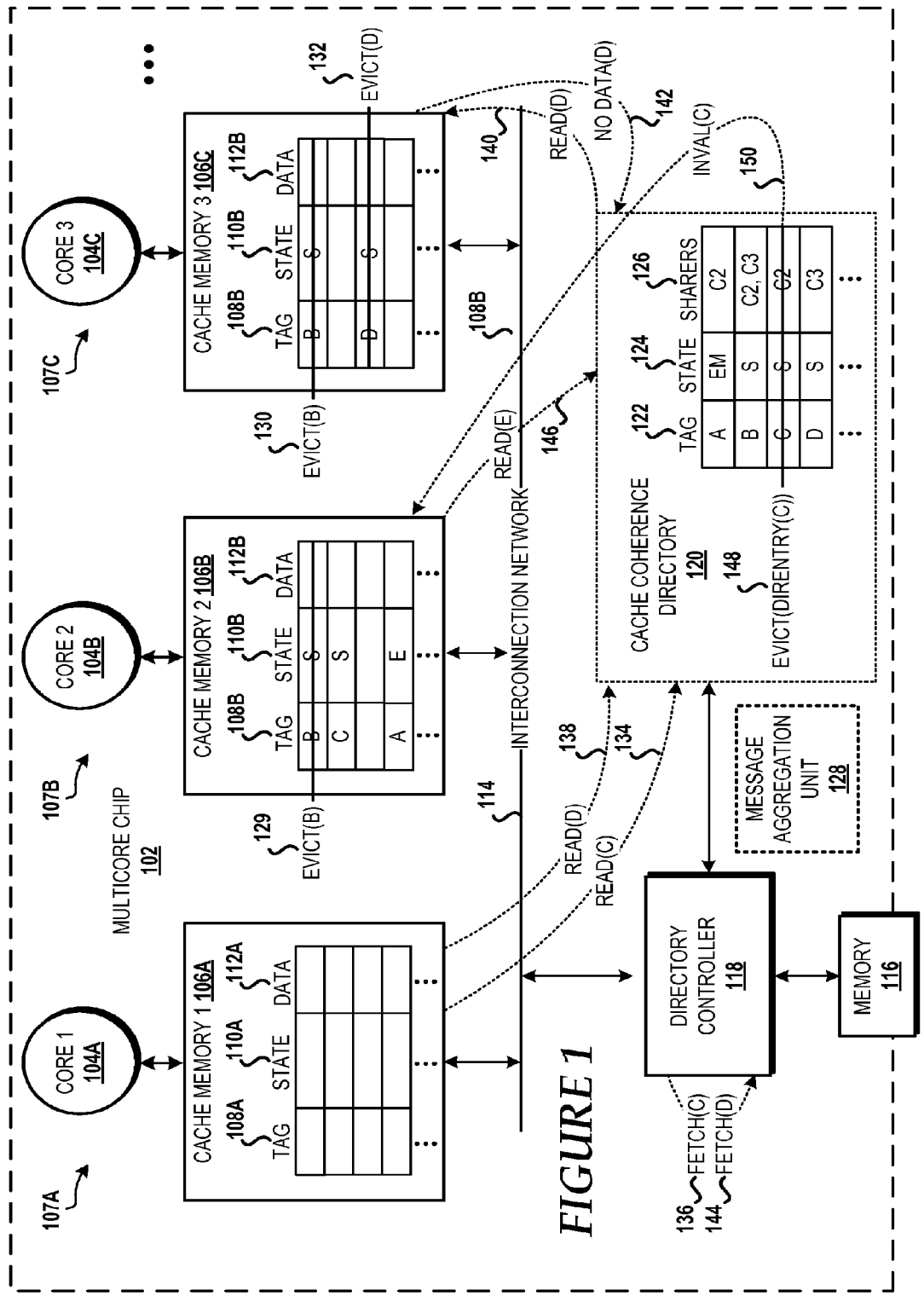
FIG. 1 is a functional block diagram illustrating aspects of an illustrative multicore chip.

all arranged in accordance with at least some embodiments described herein.

DETAILED DESCRIPTION

In the present Detailed Description, reference is made to the accompanying Figures, which form a part hereof. In the Figures, similar symbols typically identify similar components, unless context dictates otherwise. The illustrative embodiments described in the Detailed Description and Figures are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

One of the major sources of power consumption in the operation of a multicore chip is the implementation of a cache coherence protocol. A cache coherence protocol may employ a broadcast and snooping protocol or may employ a directory protocol. Both of these protocols can scale superlinearly in terms of power consumption as the number of cores increases. A broadcast protocol may utilize or require snooping and tag checking for each request made by any core. As a result, power consumption for a broadcast protocol may increase quadratically with the number of cores. A directory protocol, on the other hand, may significantly reduce traffic because a directory protocol does not rely on broadcast. Traffic in a directory protocol, therefore, may be kept relatively linear as the number of cores increases. However, directory protocol traffic may still have to travel a longer distance as the size of the network increases, and the directory size overhead may increase quadratically with the number of cores.

The power consumed by the implementation of a cache coherence protocol may consume a large fraction of the overall power budget of a multicore chip. Unfortunately, a limited or predetermined power budget may imply that the more power utilized for managing data movement and data coherence, the less power is available for computing in the cores. Consequently, improving performance in multicore chips may depend on reducing power consumption for non-compute activities. Coherence protocol invocation and traffic, therefore, should be kept to a minimum to reduce power consumption.

One of the problems with traditional directory-based cache coherence protocols is stale information in a directory. Information in a directory may be considered stale when one or more directory entries do not have the latest information as to which cache(s) keep a copy of a particular memory block. More specifically, the sharing vector field of a directory may indicate a memory block is stored by a cache even when the cache has evicted the memory block.

Some problems with stale information may arise when cache blocks that are clean (e.g., unmodified) are evicted silently from a cache (e.g., without notifying the directory). Problems with stale information cannot be fixed by notifying the directory of each clean block eviction, since most blocks evicted from the cache area are clean. That is, the large number of notifications may result in a large increase in traffic. Thus, there may be a significant trade-off between notifying the directory of each clean block eviction and having stale directory information that can be fundamentally difficult to reconcile.

This disclosure is generally drawn, inter alia, to technologies for notifying a directory of clean block eviction but with significantly reduced traffic cost of notifications. The described technologies may be embodied in many ways, including but not limited to systems, methods, devices, and computer-readable mediums.

Briefly stated, technologies described herein generally relate to aggregation of cache eviction notifications to a directory. Some example technologies may be utilized to update an aggregation table to reflect evictions of a plurality of blocks from a plurality of block addresses of at least one cache memory. An aggregate message can be generated, where the message specifies the evictions of the plurality of blocks as reflected in the aggregation table. The aggregate message can be sent to the directory. The directory can parse the aggregate message and update a plurality of directory entries to reflect the evictions from the cache memory as specified in the aggregate message.

Rather than notifying a directory controller of each clean block eviction in a cache memory via a separate message, various technologies described herein may be configured to generate an aggregate message that aggregates multiple clean block evictions into a single message. In particular, a cache memory may be coupled to a message aggregation unit. The message aggregation unit may include a control logic and an aggregation table. The aggregation table may be configured to track clean block evictions. The control logic may be configured to generate aggregate message in any appropriate format such as a bitmap format or a pointer format. The control logic may also be configured to transmit the aggregate message to a directory controller. The directory controller may be configured to parse the aggregate message and update the directory to reflect the clean block evictions that are parsed from the aggregate message. These and other aspects of various technologies for aggregating cache eviction notifications to a directory will be described in more detail herein.

FIG. 1 is a functional block diagram illustrating aspects of an illustrative multicore chip 102, arranged according to at least some embodiments presented herein. The multicore chip 102 may include a plurality of processor cores 104A-104C (hereinafter, at times, referred to collectively or generically as "processor cores 104"). The multicore chip 102 may also include a plurality of cache memories 106A-106C (hereinafter, at times, referred to collectively or generically as "cache memories 106"). Each of the cache memories 106 may be associated with one or more of the processor cores 104.

As illustrated in FIG. 1, a first cache memory 106A of the cache memories 106 may be associated with a first processor core 104A of the processor cores 104; a second cache memory 106B of the cache memories 106 may be associated with a second processor core 104B of the processor cores 104; and, a third cache memory 106C of the cache memories 106 may be associated with a third processor core 104C of the processor cores 104. In some embodiments, however, one or more of the cache memories 106 may be associated with two or more of the processor cores 104, and in other embodiments one or more processor cores 104 may be associated with two or more cache memories 106. For instance, the first cache memory 106A may be associated with both the first processor core 104A and the second processor core 104B. Other configurations between the processor cores 104 and the cache memories 106 of the multicore chip 102 are also contemplated.

The processor cores 104 and the cache memories 106 may be logically or physically associated with one or more multicore chip nodes. As illustrated in FIG. 1, the first processor core 104A and the first cache memory 106A may be included in a first multicore chip node 107A; the second processor core 104B and the second cache memory 106B may be included in a second multicore chip node 107B; and the third processor core 104O and the third cache memory 106C may be included in a third multicore chip node 107O. The cache memories 106A-106C hereinafter, at times, may be referred to collectively or generically as "cache memories 106." The multicore chip nodes 107A-107C hereinafter, at times, may be referred to collectively or generically as "multicore chip nodes 107".

Each of the cache memories 106 may be configured to store one or more cache entries. Each cache entry in the cache memories 106 may be organized according to a data structure. The data structure may include a tag field, a state field, and a data field. The tag fields may include a tag item that identifies to which memory block a particular entry corresponds. The state fields may include a coherence state item that identifies a coherence state of the memory block identified in the corresponding tag field. The data fields may include data associated with a tag value identified in the corresponding tag field.

As illustrated in FIG. 1, the first cache memory 106A is configured to store values in a first tag field 108A, a first state field 110A, and a first data field 112A; the second cache memory 106B is configured to store values in a second tag field 108B, a second state field 110B, and a second data field 112B; and the third cache memory 106C is configured to store values in a third tag field 108C, a third state field 110C, and a third data field 112C. It should be understood that each of the cache memories 106 may include any number of tag fields, state fields, or data fields.

The multicore chip 102 may also include an interconnection network 114 or a bus that functions as a path through which the processor cores 104 and the cache memories 106 may communicate with a directory controller 118. The directory controller 118 may be adapted to access a cache coherence directory 120 (hereinafter referred to as "directory 120"). The directory 120 may be implemented as a single directory or distributed across multiple directories in the multicore chip 102. In some embodiments, the directory 120 may be provided in a memory component on the multicore chip 102 that is operatively coupled to the directory controller 118. In some embodiments, the directory 120 may be implemented in a storage location that is part of the directory controller 118. In some embodiments, the directory controller 118 may be a memory controller. In some other embodiments, the directory controller 118 may be part of a memory controller adapted to control a memory 116 and the directory 120. In any case, the directory 120 may be responsible for tracking coherence states of blocks that are stored within the cache memories 106. The illustrated memory 116 is intended to be off-chip, meaning the memory is not resident on the multicore chip 102 and is instead arranged in communication with the multicore chip 102 via, for example, the directory controller 118. In some embodiments, the memory 116 is on-chip, meaning the memory is resident on the multicore chip 102.

The directory controller 118 may utilize a cache coherency algorithm to maintain consistency of data stored within one or more cache memories of the cache memories 106 and the memory 116. For ease of explanation but not limitation, a cache coherency algorithm that utilizes an exclusive state, a modified state, an invalid state, an uncached state, or a shared state to identify the state of a block is utilized herein. It should be understood, however, that there may be more or less states depending on specific implementations of the directory 120.

An exclusive state (E) may indicate that a block is exclusively stored in the corresponding cache memory. The data in the block may also be consistent with the data stored in the memory 116 (e.g., the data block is clean). A modified state (M) may indicate that a block is valid and the block is stored in the corresponding cache memory. The data in the block may be modified with respect to the data stored in the memory 116 (e.g., the data block is dirty). In other words, the modified data in the block may not have been written back to the memory 116. An invalid state (I) may indicate the block contains an invalid entry. That is, the block may not be stored in the corresponding cache memory or any data contained in the block may be considered not useful. An uncached state (U) may indicate that none of the cache memories 106 has a copy of the block. A shared state (S) may indicate that a block is clean and stored in at least two of the cache memories 106.

As illustrated in FIG. 1, the cache coherence directory 120 may include a directory tag field 122, a directory state field 124, and a sharers item field 126. The directory tag field 122 may include a tag item that may be used to distinguish to which block a particular directory entry belongs. The directory state field 124 may include a coherence state item that may identify a coherence state of the block identified in the corresponding tag field. The sharers item field 126 may identify one or more of the cache memories 106 in which a copy of the block is stored.

The sharers item field 126 may contain a sharers item. In some embodiments, the sharers item may be a full bit vector in which each of a plurality of bits is associated with a single cache memory of the cache memories 106. For instance, "010" may represent three cache memories with "1" (e.g., Logic 1) representing that the block identified by a tag item within the directory tag field 122 is kept in the corresponding cache memory, and with "0" (e.g., Logic 0) representing that the block is not kept in the corresponding cache memory. In some other embodiments, the sharers item may be a coarse bit vector in which each bit corresponds to a group of two or more of the cache memories 106. For instance, "010" may represent six cache memories with each bit being representative of two of the six cache memories. In some embodiments, the bit vector may be in a pointer format in which a binary identification is listed for each of the cache memories 106 that stores the block. For example, "00" may identify a first cache memory, "01" may identify a second cache memory, and "10" may identify a third cache memory.

The directory information in the directory 120 may be accurate initially; however, over time the directory information may become stale when the cache memories 106 do not notify the directory 120 of block evictions. As noted above, several problems may arise from stale directory information. Some of these problems will now be further described with reference to FIG. 1.

In an illustrative example depicted in FIG. 1, the directory 120 is populated with information showing that a block A is stored in a cache C2 in an exclusive or modified state (EM); block B is stored in caches C2 and C3 in a shared state (S); block C is stored in cache C2 in a shared state (S); and, block D is stored in cache C3 in a shared state (S). Cache C2 can refer to the second cache memory 106B, and cache C3 can refer to the third cache memory 106C. Over time, the second cache memory 106B (e.g., cache C2) can evict block B, as shown at operation 129, without notifying the directory 120, because block B is clean from the point of view of C2 and, therefore, can be evicted silently. The third cache memory 106C, cache C3, can evict block B, as shown at operation 130, and block D, as shown at operation 132, for the similar reasons. At this point, the directory 120 may contain stale information for block B and block D.

Increased power consumption and/or latency may be incurred in order to address the possibility of stale directory information. If the first processor core 104A registers a cache miss and requests a read access to block C from the directory 120, as shown at operation 134, the directory 120 may respond with one of at least three options. A first option is for the directory 120 to assume that the information stored for block C is stale and fetch data from the memory 116, as shown at operation 136. A second option is for the directory 120 to assume the information stored for block C is valid and forward the read request to the second cache memory 106B (C2) in which the directory 120 assumes block C is stored. A third option is for the directory 120 to combine the two aforementioned actions—forwarding the read request and simultaneously fetching block C from the memory 116.

Some drawbacks to the first option (e.g., fetching block C from the memory 116 responsive to the read request) may include the additional power consumption and latency incurred to fetch from off-chip memory, such as the illustrated memory 116, if data is actually available on-chip (e.g., in the second cache memory 106B). Some drawbacks to the second option (e.g., assume the information stored for block C is valid) may arise when the directory information is stale. The second option is illustrated at operations 138, 140, 142, 144. In this alternative strategy, the first cache memory 106A (C1) sends a read request for block D to the directory 120, as shown at operation 138. Operating under the assumption that the directory information is up to date, the directory 120 then forwards the read request to the third cache memory 106C (C3), as shown at operation 140. As explained above, the third cache memory 106C (C3) evicted block D at operation 132. As a result, the third cache memory 106C (C3) responds with an indication that no data for block D is cached. At this point, the directory 120 determines that the information for block D is stale and fetches the data for block D from the memory 116, as shown at operation 144. Although the directory 120 now includes up to date information for block D, additional power consumption and latency may be incurred in order to detect the stale information and fetch the data. Some drawbacks to the third option (e.g., simultaneously fetching from the memory 116 and forwarding the request) may reduce latency because data available on-chip can be retrieved when directory information is not stale. However, this reduced latency may come at the expense of significantly increasing power consumption in order to simultaneously perform the first option and the second option. That is, this third option may not be considered energy efficient.

The directory 120 may unnecessarily occupy a large storage overhead, since some directory entries, which are no longer needed because the corresponding memory blocks are no longer cached, occupy space in the directory 120. For instance, even an abbreviated directory format (e.g., with some fields omitted) used in some multicore chips can occupy a third or more of the available cache memory of the multicore chip. With up-to-date directory information, the directory 120 can be provisioned with a smaller number of entries to achieve the same performance, since entries that contain uncached blocks can be removed.

The replacement policy for directory entries may perform suboptimally due to a reliance on stale information. Suppose the directory 120 is full and a request is received from the second cache memory 106B (C2) to read block E, as shown at operation 146. Since the directory 120 does not contain information about block E, the directory 120 evicts an existing entry and inserts a new entry. If the directory 120 does not allow overflow, then the block may be invalidated from all caches that are indicated in the list of sharers within the sharers item field 126 of the directory 120. Overflow may be defined herein as the entry or entries that do not fit in the directory 120 and are stored in the memory 116. The entry or entries stored in the memory 116 may be fetched on-demand if needed later. Thus, some entries may be stored in the directory 120, while other entries (e.g., overflow entries) are stored in the memory 116. As a result, an effective eviction policy may be to choose a victim entry, which contains the fewest number of sharers, so that as few caches as possible are invalidated. Unfortunately, due to stale information, the fewest sharers may turn out to be associated with a block that is still being cached.

As an illustrative example, FIG. 1 shows that one block with the fewest sharers is block C, which can be selected for eviction at operation 148. Evicting block C causes an invalidation of block C from the second cache memory 106B, as shown at operation 150. For example, the directory controller 118 may be configured to transmit an invalidation message regarding block C to the second cache memory 106B. The invalidation of block C (C2) may cause performance degradation, since block C may still be needed by the second processor core 104B that is associated with the second cache memory 106B (C2). In the event that the second processor core 104B needs block C, the second processor core 104B will suffer a cache miss when access to block C is attempted. In contrast, block B is listed in the directory 120 as being shared by the second cache memory 106B (C2) and the third cache memory 106C (C3), while in fact block B is no longer cached by either of these cache memories. If block B were selected for eviction, there would not be any performance penalty because block B is no longer cached in any of the cache memories 106.

A fourth problem of stale directory information may be excessive invalidation traffic. As previously described, when a block is evicted from the directory 120 as a result of a write request, the directory controller 118 may be configured to transmit an invalidation message regarding the block to each cache memory recorded by the directory 120 as keeping a copy of the block. Such invalidation messages that are sent to these cache memories could be avoided if the directory 120 had up-to-date information that all or some of the cache memories no longer contain a copy of the block.

The technologies disclosed herein can address, at least in part, the various problems described above, by utilizing a message aggregation unit (MAU) 128. The MAU 128 may be configured to aggregate eviction notifications to the directory 120. The MAU 128 will be described in greater detail herein below with reference to FIG. 3.

FIG. 1 illustrates one multicore chip 102, one interconnection network 114, one memory 116, one directory controller 118, and one cache coherence directory 120. It should be understood, however, that some implementations of the operating environment 100 may include two or more multicore chips 102, two or more interconnection networks 114, two or more memories 116, two or more directory controllers 118, and two or more cache coherence directories 120. Thus, the various embodiments described herein should be understood as being illustrative of some examples of the operating environment 100 and should not be construed as being limiting in any way.

FIG. 2 is a table 200 illustrating an example comparison among the size of per-block eviction notification messages in a traditional directory protocol, in contrast to an aggregated eviction notification message in a bitmap format and an aggregated eviction notification message in a pointer format, arranged according to at least some embodiments presented herein. As will be described in greater detail herein, eviction messages can be aggregated by modifying the eviction message format so that a single message can encapsulate multiple blocks information.

The table 200 shows how five evicted blocks being evicted can consume a different amount of traffic depending on whether eviction notifications messages are aggregated and how eviction notification messages can be aggregated. The table 200 includes an evicted block address portion 202 and a size of eviction message(s) portion 204. The illustrated evicted block address portion 202 is populated with block addresses for the five evicted blocks. The size of eviction message(s) portion 204 includes a traditional per-block eviction message portion 206, a message aggregation bitmap format portion 208, and a message aggregation pointer format portion 210.

As illustrated in FIG. 2, the message size shown in these portions includes the address component of the message. However, according to some other embodiments, additional bits or bytes may be added to each message to encode other information, such as the packet header, command type, or error detection/correction code. The message size, as illustrated in FIG. 2, assumes a 42-bit physical address with 64-byte block size. It should be understood, however, that different sizes for the physical address or the block size may be used.

As illustrated in FIG. 2, each traditional per-block eviction message portion may be encoded as a sequence of nine hexadecimal digits. Each hexadecimal digit may represent 4 bits. As a result, each traditional per-block eviction message portion may amount to 36 bits (9 hexadecimal digits×4 bits per hexadecimal digit), which in turn results in 4.5 bytes per block (36 bits/8 bytes per bit) in size. If each block eviction sends a message to the directory 120, five messages are sent with a total traffic of 22.5 bytes (5 messages×4.5 bytes per message), as shown in a total portion 212 of the table 200 for a traditional per-block eviction scheme.

As illustrated in FIG. 2, the five traditional per-block eviction message portions may be aggregated into a single aggregate message portion in either bitmap format or pointer format. In particular, an observation can be made that the five traditional per-block eviction message portions include a common root, such as a root 214 (e.g., 4C5FA7A0). That is, the last hexadecimal digit differs between the five traditional per-block eviction message portions. Thus, the five per-block eviction message portions may be aggregated into a single aggregate message portion containing the root 214 and an identification of the last hexadecimal digit. The last hexadecimal digit may be encoded in a bitmap format or a pointer format.

An aggregate message portion, in bitmap format, may be encoded as a sequence of eight hexadecimal digits (e.g., the root 214) and a bitmap 216. The root 214 may represent a region of 1 kilobyte in size and sixteen possible blocks, as shown in the total portion 212 for the bitmap format. The bitmap 216 may be utilized to represent which block(s) in the region has been evicted from a cache, with the appropriate bit(s) set to "1" to represent an evicted block and "0" to represent a non-evicted block. As illustrated in FIG. 2, a 16-bit bitmap is utilized, but other bitmap sizes may be used depending on a particular implementation.

The number of "1" bits in a given bit string is referred to herein as the population count or "popcount." For example, the bitmap 216 contains five "1" bits, and so the popcount for the bitmap 216 is five. As another example, the bit string "0111" contains three "1" bits, and so the popcount for the bit string "0111" is three.

Each hexadecimal digit may represent 4 bits of an aggregate message in bitmap format. As a result, an example aggregate message portion in bitmap format may be 48 bits (8 hexadecimal digits×4 bits per hexadecimal digit+16 bits) or 6 bytes (48 bits/8 bytes per bit). In other words, an aggregate message portion in bitmap format may include a 4-byte root and a 2-byte bitmap for a total of 6 bytes, as shown in the total portion 220 for the bitmap format.

An aggregate message portion in pointer format may be encoded as a sequence of eight hexadecimal digits (e.g., the root 214) and a list 218 of hexadecimal values of the block addresses that share the root 214. The root 214 may represent a region of 1 kilobyte in size and sixteen possible blocks, as shown in the total portion 212 for the bitmap format. To represent which block(s) in the region has been evicted from a cache, the list 218 may be utilized, with each hexadecimal value included in the list 218 representing an evicted block or a non-evicted block.

Each hexadecimal digit may represent 4 bits of an aggregate message in pointer format. As a result, an example aggregate message portion in pointer format may be 52 bits (8 hexadecimal digits×4 bits per hexadecimal digit+5 hexadecimal digits×4 bits per hexadecimal digit) or 6 bytes (52 bits/8 bytes per bit). In other words, an aggregate message portion in pointer format may include a 4-byte root and a 2.5-byte list for a total of 6.5 bytes, as shown in the total portion 222 for the pointer format.

As shown in FIG. 2, the five messages may be aggregated into one eviction notification message such that the total message size is reduced significantly. In particular, using a bitmap format for an aggregated notification message may reduce the total traffic from 22.5 bytes to 6 bytes, and using a pointer format may reduce the total traffic from 22.5 bytes to 6.5 bytes, as shown by respective traffic totals within total portions 220 and 222 of the table 200. In this example, message aggregation can reduce the message size, the traffic, or traffic-related energy use by about 73% (1-6 bytes/22.5 bytes) utilizing the bitmap format, and by about 71% (1-6.5 bytes/22.5 bytes) utilizing the pointer format. Traffic-related energy may be defined herein as energy consumption incurred for the traffic, and excluding energy consumption incurred for a processor, cache, logic, and/or other components.

Figure 3:
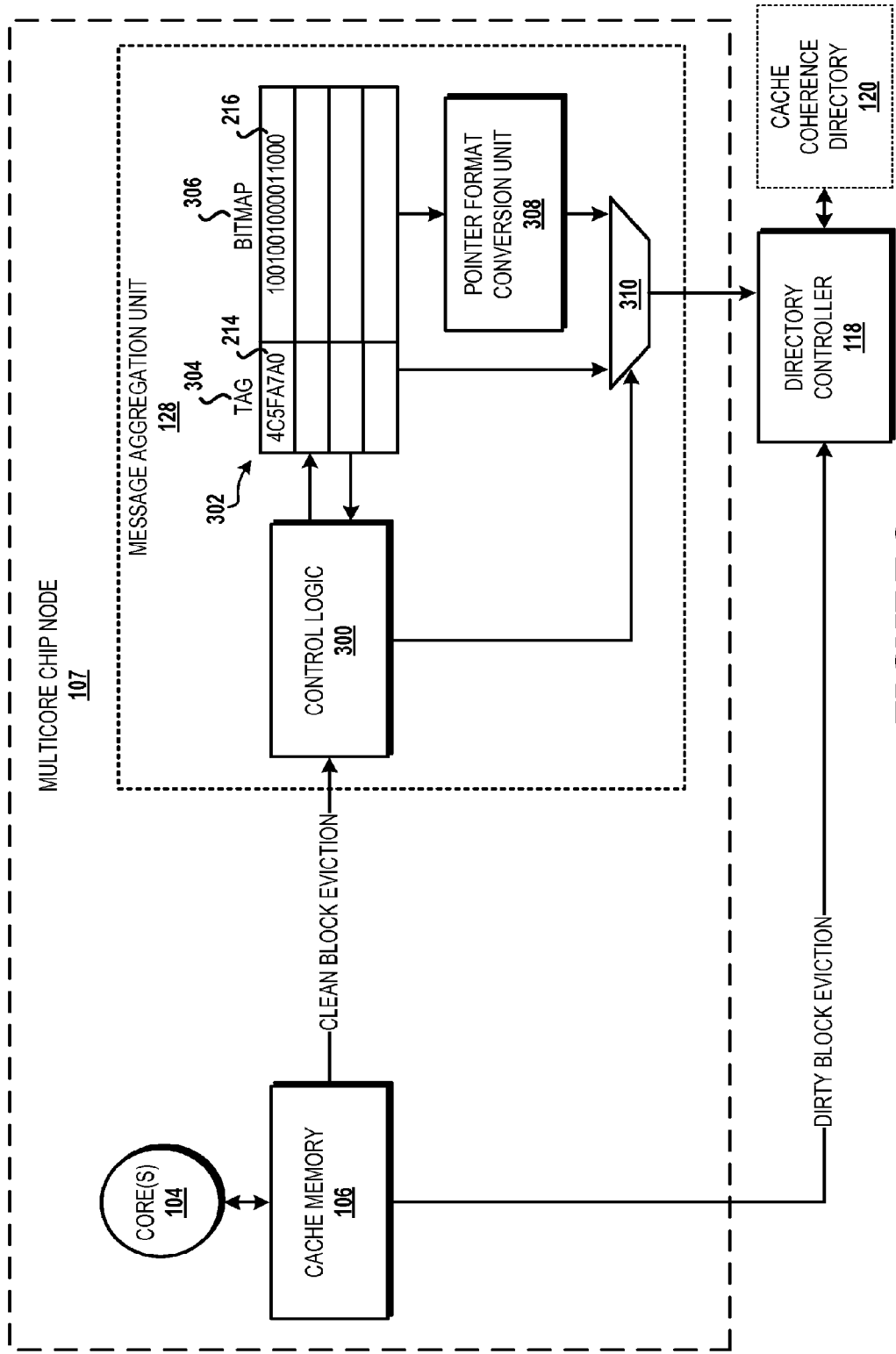
FIG. 3 is a functional block diagram illustrating aspects of a multicore chip node of a multicore chip in which a message aggregation unit is utilized to aggregate eviction notifications to a directory.

FIG. 3 is a functional block diagram illustrating aspects of a multicore chip node 107 of the multicore chip 102 in which the message aggregation unit 128 is utilized to aggregate eviction notifications to the directory 120, arranged according to at least some embodiments presented herein. The multicore chip node 107 may include one or more processor cores 104 and a cache memory 106. The multicore chip node 107 may also include a message aggregation unit, such as the MAU 128 introduced above with reference to FIG. 1. According to some embodiments, the MAU 128 may be implemented within a particular level of cache memory. For instance, the MAU 128 may be implemented in a last level cache. As illustrated in FIG. 3, the MAU 128 is shown as being operatively coupled to the cache memory 106. It should be understood, however, that the MAU 128 may be implemented as part of the cache memory 106.

The MAU 128 may include a control logic 300 arranged in communication with an aggregation table 302. The control logic 300 may be configured to update the aggregation table 302 to reflect evictions of one or more blocks from the cache memory 106. The control logic 300 may also be configured to generate an aggregate message in which the block evictions may be specified as reflected in the aggregation table 302. The control logic 300 may be further configured to send the aggregate message to the directory controller 118. The directory controller 118 may be configured to parse the aggregate message and update one or more directory entries in the directory 120 to reflect the evictions from the cache memory 106 that are parsed from the aggregate message.

The aggregation table 302 is a data structure that is organized according to multiple fields, such as a tag field 304 and a bitmap field 306 in the illustrated example. The tag field 304 may contain values that correspond to one or more common roots, each of which may be shared among two or more block addresses that have been evicted from the cache memory 106. In the example shown in FIG. 3, the tag field 304 contains a value that corresponds to the root 214. The bitmap field 306 may contain values that correspond to one or more bitmaps. In the example shown in FIG. 3, the bitmap field 306 contains a value for the bitmap 216.

The MAU 128 may also include a pointer format conversion unit 308 and a multiplexer 310. The pointer format conversion unit 308 may be configured to convert a bitmap, such as the bitmap 216, into a plurality of pointer values corresponding to a plurality of bits in the bitmap. The multiplexer 310 may be configured to send, at the instruction of the control logic 300, an aggregate message to the directory controller 118. As previously described, the directory controller 118 may be configured to parse the aggregate message and update one or more directory entries in the directory 120 to reflect the evictions from the cache memory 106 that are parsed from the aggregate message.

When the cache memory 106 evicts a dirty block, the cache memory 106 may notify the directory 120 via the directory controller 118 as in a traditional directory protocol. However, when a clean block is evicted, rather than being evicted silently as in a traditional directory protocol, the cache memory 106 may notify the MAU 128 via the control logic 300. The control logic 300 may then determine if the aggregation table 302 contains an entry corresponding to the block address of the evicted block. In response to determining that the aggregation table 302 does not contain a table entry corresponding to the block address, the control logic 300 may create a table entry in the aggregation table 302 and update the entry to reflect the eviction of the block from the block address. In response to determining that the aggregation table 302 contains a table entry corresponding to the block address, the control logic 300 may update the table entry to reflect the eviction of the block from the block address. For example, the control logic 300 may be configured to change the value of a bit corresponding to the evicted block from a "0" bit value to a "1" bit value.

When an entry is determined to be evicted from the MAU 128, the control logic 300 may be configured to generate a first aggregate message. The first aggregate message may include a tag portion (e.g., a root portion) extracted from the tag field 304, such as the root 214, and a bitmap portion extracted from the bitmap field, such as the bitmap 216. The control logic 300 may also be configured to coordinate operation of the pointer format conversion unit 308 to convert the bitmap 216 into a plurality of pointer values corresponding to a plurality of bits in the bitmap having a value indicating that an associated block is either evicted or not evicted. The control logic 300 may further be configured to generate a second aggregate message. The second aggregate message may include the tag portion and a pointer portion that includes the plurality of pointer values. The control logic 300 may also be configured to select the first or second aggregate message based on which of the messages has a smaller data size. The control logic 300 may be configured to coordinate operation (e.g., instruct) the multiplexer 310 to send either the first aggregate message or the second aggregate message to the directory 120 via the directory controller 118 based upon the selection of the first aggregate message or the second aggregate message made by the control logic 300.

Figure 4:
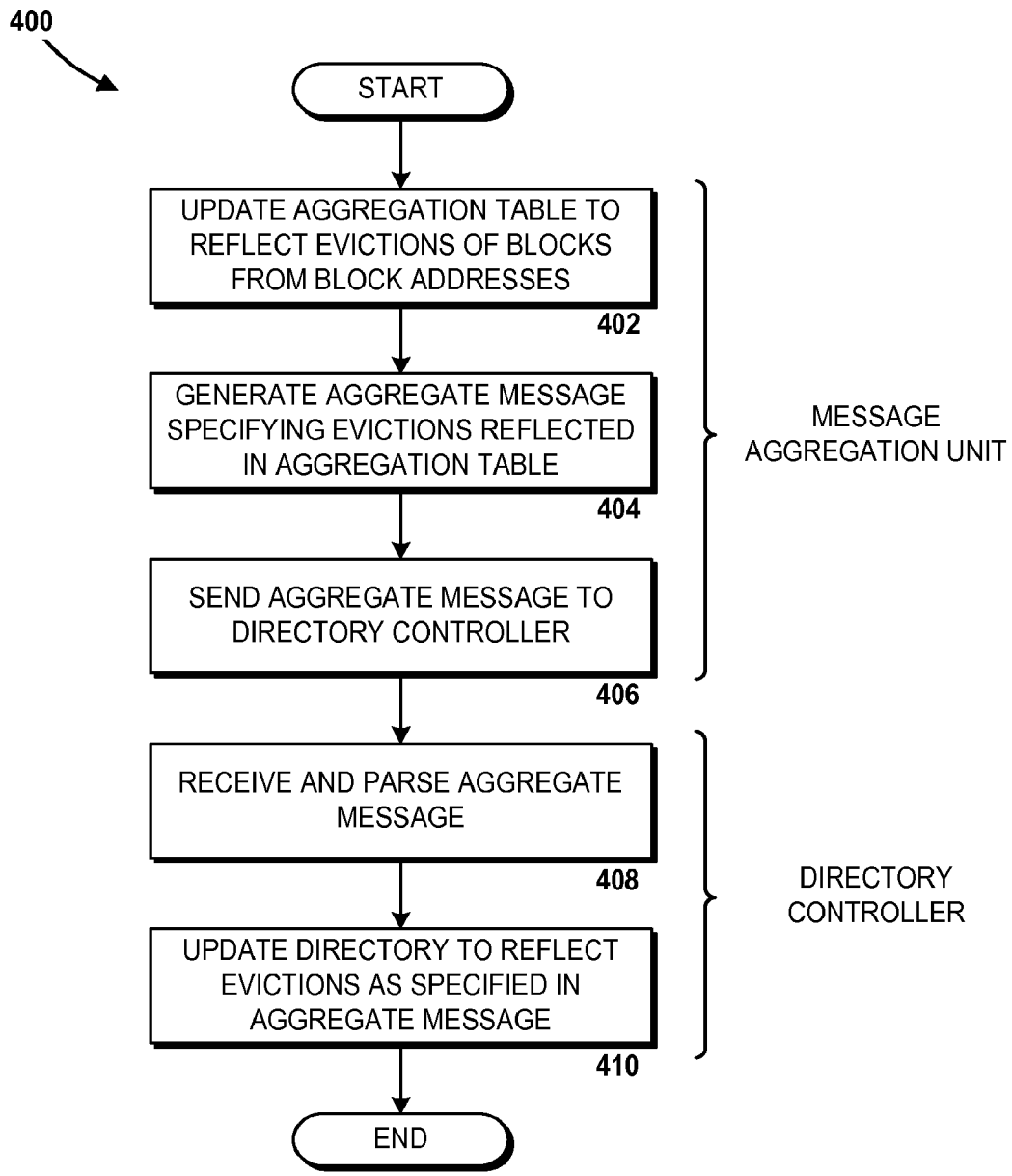
FIG. 4 is a flow diagram illustrating an example process adapted to aggregate cache eviction notifications to a directory.

FIG. 4 is a flow diagram illustrating an example process 400 configured to aggregate cache eviction notifications to a directory, arranged according to at least some embodiments presented herein. The process 400 may include various operations, functions, or actions as illustrated by one or more blocks 402-410.

The process 400 may begin at block 402 (Update Aggregation Table to Reflect Evictions of Blocks from Block Addresses), wherein the MAU 128 may be configured to update the aggregation table 302 to reflect evictions of a plurality of blocks from a plurality of block addresses of at least one cache memory, such as at least one of the cache memories 106. According to some embodiments, the evicted blocks are clean blocks. According to some other embodiments, the MAU 128 may be configured to ignore evictions of one or more dirty blocks. Block 402 may be followed by block 404.

At block 404 (Generate Aggregate Message Specifying Evictions Reflected in Aggregation Table), the MAU 128 may be configured to generate an aggregate message. The aggregate message may specify the evictions of the plurality of blocks as reflected in the aggregation table 302. In some embodiments, the aggregate message may be formatted in a bitmap format. In some other embodiments, the aggregate message may be formatted in a pointer format. Block 404 may be followed by block 406.

At block 406 (Send Aggregate Message to Directory Controller), the MAU 128 may be configured to send the aggregate message to the directory controller 118. Block 406 may be followed by block 408.

At block 408 (Receive and Parse Aggregate Message), the directory controller 118 may be configured to receive and parse the aggregate message to identify the evictions. Block 408 may be followed by block 410.

At block 410 (Update Directory to Reflect Evictions as Specified in Aggregate Message), the directory controller 118 may be configured to update the directory 120 to reflect the evictions as specified in the aggregate message. After block 410, the process 400 may repeat (e.g., periodically, continuously, or on-demand) or may terminate at any time, as noted above.

Figure 5:
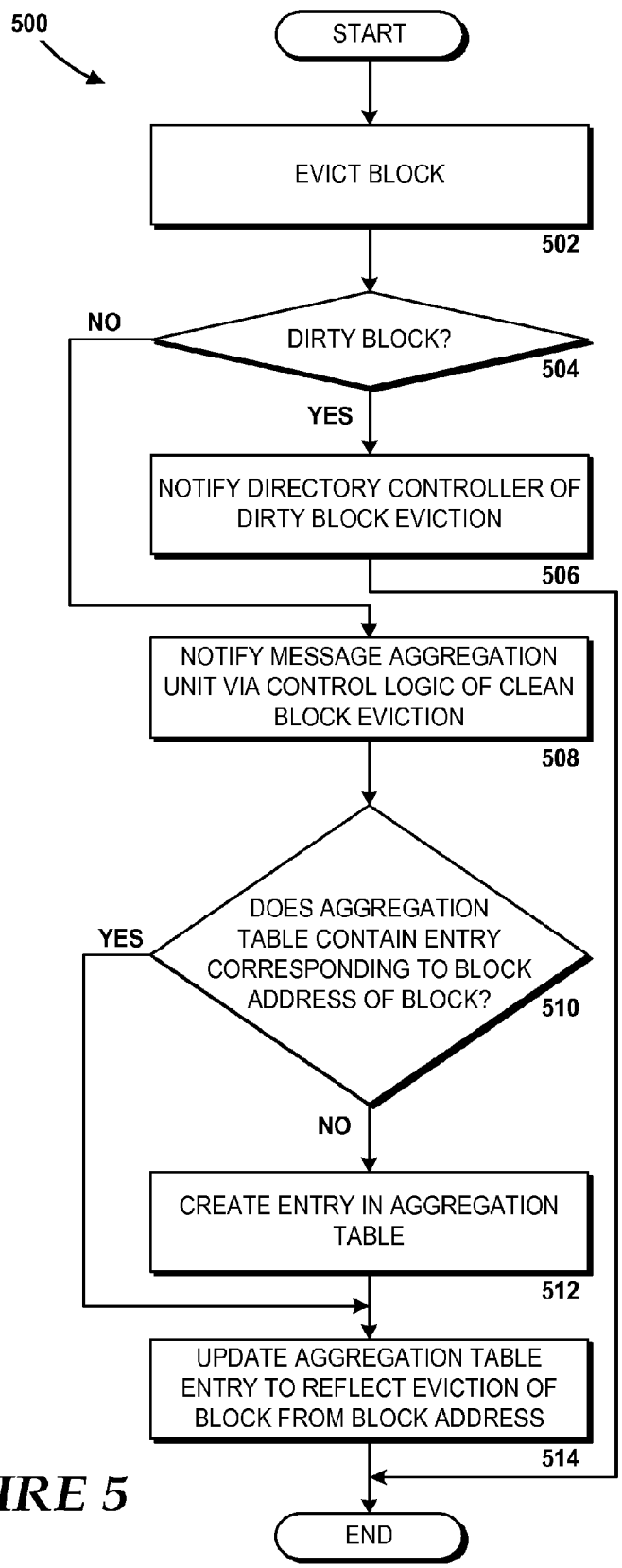
FIG. 5 is a flow diagram illustrating an example process adapted to handle cache evictions.

FIG. 5 is a flow diagram illustrating an example process 500 adapted to handle cache evictions, arranged according to at least some embodiments presented herein. The process 500 may include various operations, functions, or actions as illustrated by one or more blocks 502-514.

The process 500 may begin at block 502 (Evict Block), wherein the cache memory 106 may be configured to evict a block. Block 502 may be followed by block 504.

At block 504 (Dirty Block?), if the block evicted by the cache memory 106 at block 502 is a dirty block, then the process 500 may proceed from block 504 to block 506. At block 504 (Dirty Block?), if the block evicted by the cache memory 106 at block 502 is not a dirty block, then the process 500 may proceed from block 504 to block 508. As described above, a dirty block is a block that contains data that has been modified with respect to the data stored in a memory, such as the memory 116.

At block 506 (Notify Directory Controller of Dirty Block Eviction), wherein the cache memory 106 may be configured to send a notification message to the directory controller 118 so that the directory controller 118 can notify the directory 120 of the dirty block eviction. The notification message may include the new data block value. After block 506, the process 500 may repeat (e.g., periodically, continuously, or on-demand) or may terminate at any time, as noted above.

At block 508 (Notify Message Aggregation Unit via Control Logic of Clean Block Eviction), the cache memory 106 may be configured to send a notification message to the control logic 300 so that the control logic 300 can notify the MAU 128 of the clean block eviction. For example, when a block is evicted by the cache memory 106, if the block is clean, the tag portion of the block address may be sent to the control logic 300. Block 508 may be followed by block 510.

At block 510 (Does Aggregation Table Contain Entry Corresponding to Block Address of Block?), responsive to the received message from the control logic 300, the MAU 128 may be configured to determine if the aggregation table 302 contains an entry corresponding to the block address of the evicted block. If the MAU 128 determines that the aggregation table 302 does not contain an entry corresponding to the block address of the evicted block, then the process 500 may proceed from block 510 to block 512. If the MAU 128 determines that the aggregation table 302 contains an entry corresponding to the block address of the evicted block, then the process 500 may proceed from block 510 to block 514.

At block 512 (Create Entry in Aggregation Table), responsive to the received message from the control logic 300, the MAU 128 may be configured to create an entry corresponding to the block address of the evicted block in the aggregation table 302. Block 512 may be followed by block 514.

At block 514 (Update Aggregation Table Entry to Reflect Eviction of Block from Block Address), responsive to the received message from the control logic 300, the MAU 128 may be configured to update the entry created at block 512 to reflect the eviction of the block from the block address. After block 514, the process 500 may repeat (e.g., periodically, continuously, or on-demand) or may terminate at any time, as noted above.

Figure 6:
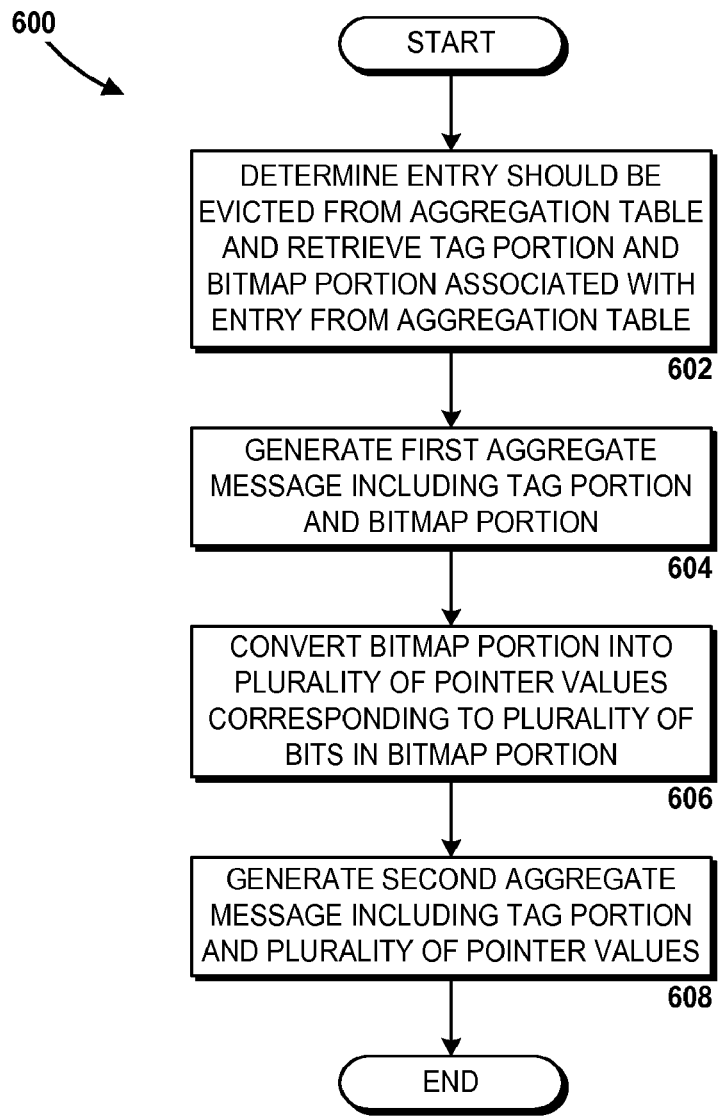
FIG. 6 is a flow diagram illustrating an example process adapted to generate aggregate eviction notification messages.

FIG. 6 is a flow diagram illustrating an example process 600 adapted to generate aggregate eviction notification messages, arranged according to at least some embodiments presented herein. The process 600 may include various operations, functions, or actions as illustrated by one or more blocks 602-608.

The process 600 may begin at block 602 (Retrieve Tag Portion and Bitmap Portion Associated with Entry from Aggregation Table), wherein the MAU 128 may be configured to determine that an entry should be evicted from the aggregation table 302. At block 602, the MAU 128 may also be configured to retrieve a tag portion (e.g., a root) and a bitmap portion from the aggregation table 302 in response to a determination that an entry should be evicted from the aggregation table 302. Block 602 may be followed by block 604.

At block 604 (Generate First Aggregate Message Including Tag Portion and Bitmap Portion), responsive to retrieving the tag portion and the bitmap portion from the aggregation table 302, the MAU 128 may be configured to generate a first aggregate message, which may include the tag portion and the bitmap portion. Block 604 may be followed by block 606.

At block 606 (Convert Bitmap Portion into Plurality of Pointer Values Corresponding to Plurality of Bits in Bitmap), responsive to generating the first aggregate message, the MAU 128 may be configured to instruct the pointer format conversion unit 312 to convert the bitmap portion into a plurality of pointer values corresponding to a plurality of bits in the bitmap. Block 606 may be followed by block 608.

At block 608 (Generate Second Aggregate Message Including Tag Portion and Plurality of Pointer Values), responsive to generating the first message, the MAU 128 may be configured to generate a second aggregate message, which may include the tag portion and the plurality of pointer values. After block 608, the process 600 may repeat (e.g., periodically, continuously, or on-demand) or may terminate.

Figure 7:
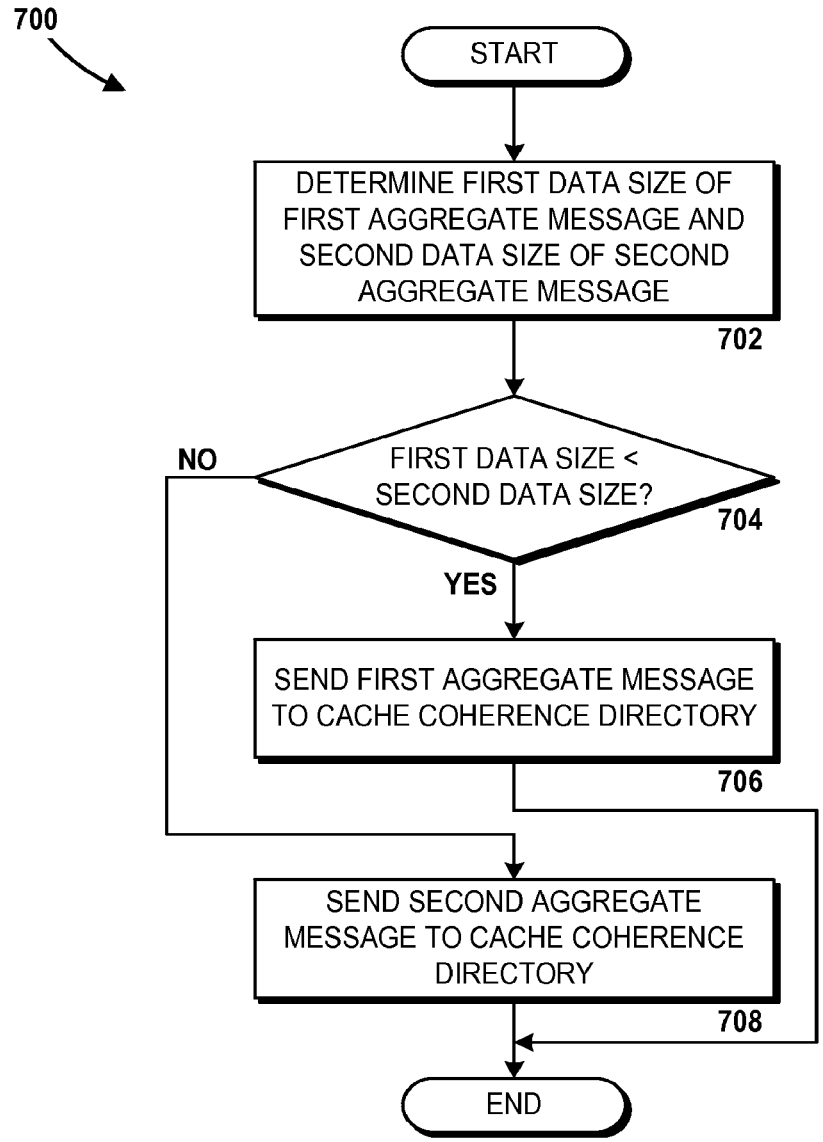
FIG. 7 is a flow diagram illustrating an example process adapted to select an aggregate eviction notification message.

FIG. 7 is a flow diagram illustrating an example process adapted to select an aggregate eviction notification message, arranged according to at least some embodiments presented herein. The process 700 may include various operations, functions, or actions as illustrated by one or more blocks 702-708. Moreover, the process 700 may assume that a first aggregate message and a second aggregate message in a bitmap format and a pointer format, respectively, have been generated, such as in accordance with the process 600 described herein above with reference to FIG. 6.

The process 700 may begin at block 702 (Determine First Data Size of First Aggregate Message and Second Data Size of Second Aggregate Message), wherein the MAU 128 may be configured to determine a first data size of the first aggregation message and a second data size of the second aggregation message. The MAU 128 may determine a first data size of the first aggregation message and the second aggregation message in response to generation of the first aggregate message and the second aggregate message, such as described herein above with reference to the process 600 illustrated in FIG. 6. Block 702 may be followed by block 704.

At block 704 (First Data Size<Second Data Size?), responsive to determining the first data size of the first aggregate message and the second data size of the second aggregate message, the MAU 128 may be configured to evaluate the data sizes and determine whether the first data size is less than the second data size. If the MAU 128 determines that the first data size is less than the second data size, then the process 700 may proceed from block 704 to block 706. If the MAU 128 determines that the first data size is not less than the second data size, then the process 700 may proceed from block 704 to block 708.

At block 706 (Send First Aggregate Message to Cache Coherence Directory), the MAU 128 may be configured to send the first aggregate message to the directory 120. After block 706, the process 700 may repeat (e.g., periodically, continuously, or on-demand) or may terminate.

At block 708 (Send Second Aggregate Message to Cache Coherence Directory), the MAU 128 may be configured to send the second aggregate message to the directory 120. After block 708, the process 700 may repeat (e.g., periodically, continuously, or on-demand) or may terminate.

The preceding description is directed, at least in part, to how clean block eviction notifications can be aggregated into a single message, how much notification message size can be reduced through aggregation, two illustrative formats for an aggregated message and how to select one of the formats, and system components configured to integrate eviction message aggregation into a traditional directory-based coherent multicore system. The following description details illustrate message aggregation units and what may, in certain implementations, be considered an optimum unit size. The following description begins with the construction of a mathematical model, an analysis of the model, and the design of a solution based upon observation of the model.

First, suppose an MAU granularity of x number of blocks. The MAU granularity can be represented by the number of bits contained in a bitmap stored in the bitmap field 306. For example, the MAU granularity of the bitmap 216 may be sixteen blocks because the illustrated bitmap 216 contains sixteen bits. The bitmap 216 contains sixteen bits of which five are "1" bits. As described above, the number of "1" bits in a given bit string is referred to herein as the population count or "popcount." Because the bitmap 216 may contain sixteen bits of which five are "1" bits, the bitmap 216 may have a population count or "popcount" of five. As also described above, the popcount may be representative of a number of evicted blocks. In other words, the popcount for the bitmap 216 can be five because the bitmap 216 contains five "1" bits, which indicates that there are five evicted blocks.

A function can be used to express an average value of the popcount (i.e., the average number of evicted blocks) of a bitmap of granularity x number of blocks. The average may be calculated by summing pop counts of various blocks and then dividing the sum by the number of blocks counted. The average may be computed over a fixed period of time, which may be re-computed at every certain time interval. A function to express the average value of the popcount of a bitmap of granularity x number of blocks may be referred to herein as $pop(x)$. For ease of description, the function $pop(x)$ may be referred to as the "popcount function."

With a bitmap format, the aggregation message size can be determined as $c+x/8$ bytes, where c is a constant that represents the size of the root (e.g., 4 bytes) and additional bits used for packet header and error correction/detection code, and where x/8 represents x number of blocks divided by 8 bits per byte. For example, the size of the aggregate message portion in bitmap format as illustrated in FIG. 2 may be determined as 4 bytes+16/8 bytes or 6 bytes, as shown in the total portion 220 for the bitmap format.

With a pointer format, the aggregation message size can be determined as $c+pop(x)lg(x)/8$ bytes (note: lg is a symbol for log with a base 2). Because a pointer can be used to represent each evicted block in a given bitmap of MAU granularity x, the popcount function, $pop(x)$, may also represent a quantity of pointers used to represent the evicted blocks indicated by the bitmap. Also, $lg(x)$ may represent a number of bits used to represent each pointer. For example, the size of aggregate message portion in pointer format as illustrated in FIG. 2 can be determined as 4 bytes+5 bytes×lg(16)/8 bytes or 6.5 bytes, as shown in the total portion 222 for the pointer format.

Further, suppose that there are N total clean blocks that are evicted from a cache. The number of messages to be sent therefore can be determined as $N/pop(x)$, or in other words, the number of clean blocks divided by the average value of the popcount of a bitmap of granularity x number of blocks. The total traffic for a bitmap ($Traffic_{Bitmap}$) can be represented as the product of the number of eviction messages sent multiplied by the size of the aggregation message and can be expressed as (in number of bytes):

$$Traffic_{Bitmap} = \frac{N}{pop(x)}\left(c + \frac{x}{8}\right),$$

or in pointer format:

$$Traffic_{Pointer} = \frac{N}{pop(x)}\left(c + \frac{pop(x)lg(x)}{8}\right). \quad (Eq. 1)$$

The technologies described herein may be configured to minimize the value of Traffic. In Equation 1, the popcount function, $pop(x)$ is unknown. The popcount function may depend on the characteristic of the application in terms of spatial locality of eviction (e.g., whether evicted blocks are from contiguous addresses). The eviction spatial locality is different from cache spatial locality because the eviction spatial locality is based on eviction stream, not miss stream. If the eviction spatial locality is perfect, the popcount function is an identity function, where $pop(x)=x$. The identity function indicates that, at any aggregation unit granularity, all blocks in that unit granularity are evicted within a particular time period (e.g., within the time the unit is resident in the aggregation table 302). In the worst case scenario in which eviction spatial locality is non-existent, the popcount function can be determined as $pop(x)=1$; this would mean that whatever the granularity is, there is one block in that granularity unit that is evicted. More likely, realistic eviction spatial locality is high when x is small, but decreases as x increases, an example of which is illustrated in FIG. 8 and described below.

Figure 8:
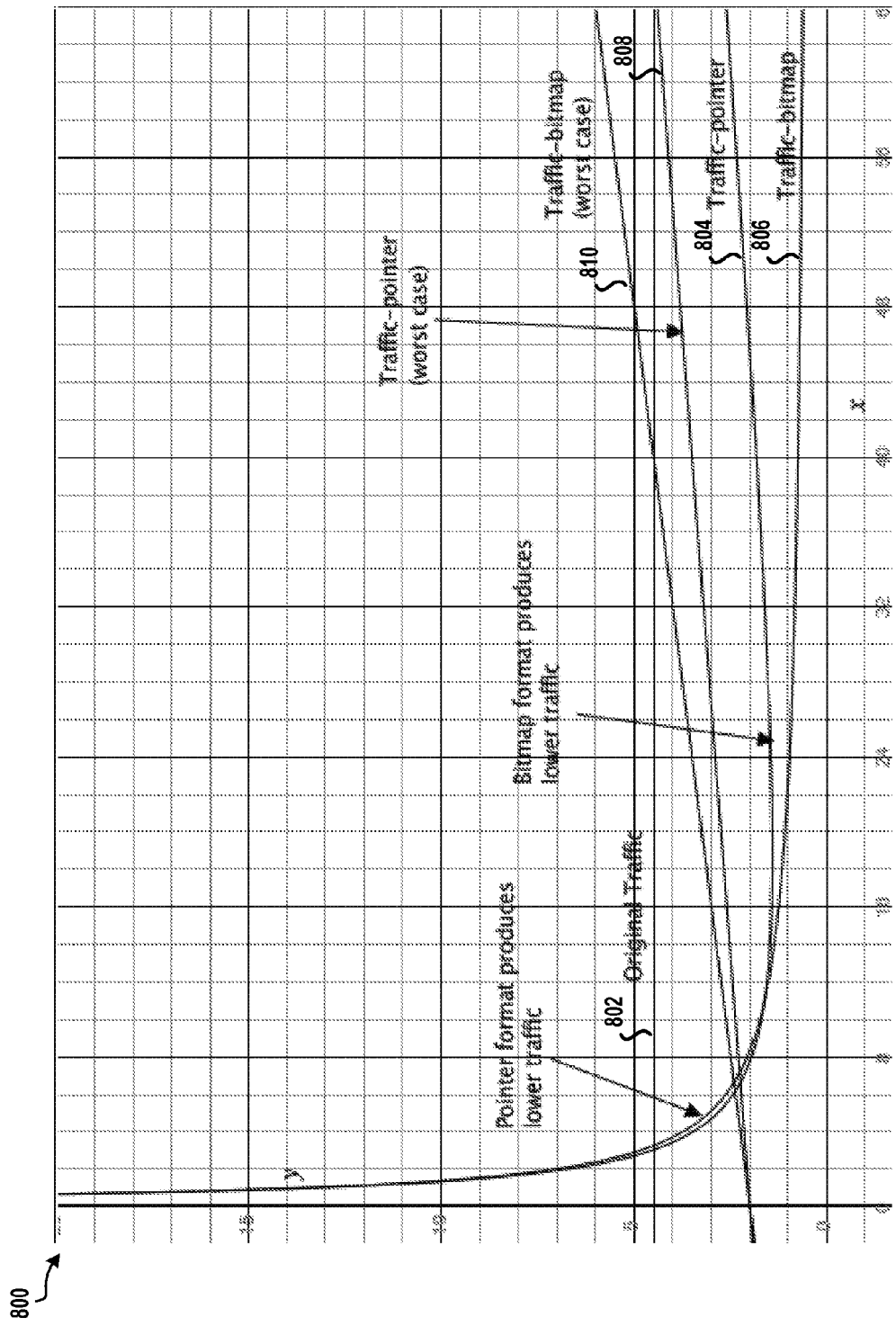
FIG. 8 is a graph illustrating an example comparison of traffic utilizing a traditional directory protocol, traffic utilizing aggregation with a bitmap format, and traffic utilizing aggregation with a pointer format.

FIG. 8 is a graph 800 illustrating an example comparison of traffic utilizing a traditional directory protocol, traffic utilizing aggregation with a bitmap format, and traffic utilizing aggregation with a pointer format, arranged according to at least some embodiments presented herein. The graph 800 assumes that the popcount function is determined as $pop(x)=lg(x)$ and shows the traffic under three schemes: Original Traffic (no aggregation of eviction notifications) 802 vs. Traffic-Pointer (aggregation using pointer format) 804 vs. Traffic-Bitmap (aggregation using bitmap format) 806. In the graph 800, the x-axis shows the unit granularity in number of blocks, while the y-axis shows the Traffic for each block eviction (in bytes). The graph 800 also shows a worst case for the Traffic-Pointer and the Traffic-Bitmap, shown as 808 and 810, respectively. The graph 800 also shows an example worst case scenario, where the popcount function remains with a value of two regardless of the value of x (e.g., pop(x)=2).

From the graph 800, the following observations can be made. First, both pointer (Traffic-Pointer) and bitmap (Traffic-Bitmap) formats can save a significant amount of traffic over a traditional scheme without aggregation. For example, as shown in the graph 800, when the unit granularity in number of blocks (x) is determined as x=16, both the pointer and bitmap formats may reduce traffic in a range between about 60-70%. Second, for small granularity units (e.g., x<8), the pointer format may produce less traffic, while at larger granularity units (e.g., x>8), the bitmap format may produce less traffic. Third, the optimum granularity may depend on which format is used. The graph 800 shows that the larger x, the less traffic may be incurred by Traffic-Bitmap. Fourth, in the example worst case spatial locality (e.g., pop(x)=2), larger unit granularity (x) values may produce worse traffic than smaller granularity (x) values. In this case, Traffic-Bitmap may be considered more risky to use when x is large compared to Traffic-Pointer.

From the above observations, it may be reasonable to conclude that the pointer format may be optional to implement as it may not outperform the bitmap format by a large margin. However, the traffic reduction from the bitmap format may depend on achieving the optimum aggregation unit granularity.

In order to obtain the optimum aggregation unit, suppose that the average value of the popcount of a bitmap of granularity x number of blocks, pop(x), is known for any range of value of granularity (x) of interest. Utilizing Equation 1, above, it can be derived mathematically that the bitmap format outperforms the pointer format if the measured average value of the popcount of a bitmap of granularity x number of blocks satisfies the following criteria:

$$pop(x) > \frac{x}{lg(x)}. \quad (Eq. 2)$$

Also, suppose that two granularity units x and y are compared, where x>y. Utilizing a larger granularity unit may reduce traffic when the following criteria are met:

$$pop(y) > \frac{c}{pop(x)} + \frac{x-y}{8}. \quad (Eq. 3)$$

Consequently, as long as the average value of the popcount, pop(x), is known for a range of x, Equations 2 and 3 can be used to directly determine which granularity and format to use.

To profile the average popcount of a bitmap of granularity x (e.g., the popcount function, pop(x)), a snapshot of regions in the aggregation table 302 can be taken. For example, a random sample of the largest region to be considered for aggregation (e.g., 4 KB) may be selected using a seed from the most recent address of an evicted block. The aggregation table 302 may then be probed for neighboring subregions that form the largest region of interest. If a subregion is found, the bitmap may be copied and concatenated with bitmaps from other subregions. If a subregion is not found, the bitmap may be assigned as "000 . . . 0" before concatenation. The final bitmap from concatenating subregions' bitmaps form the bitmap of the entire region. From that, population counts can be derived by dividing the bitmaps into equal-sized subregions and computing the average popcount.

Figure 9:
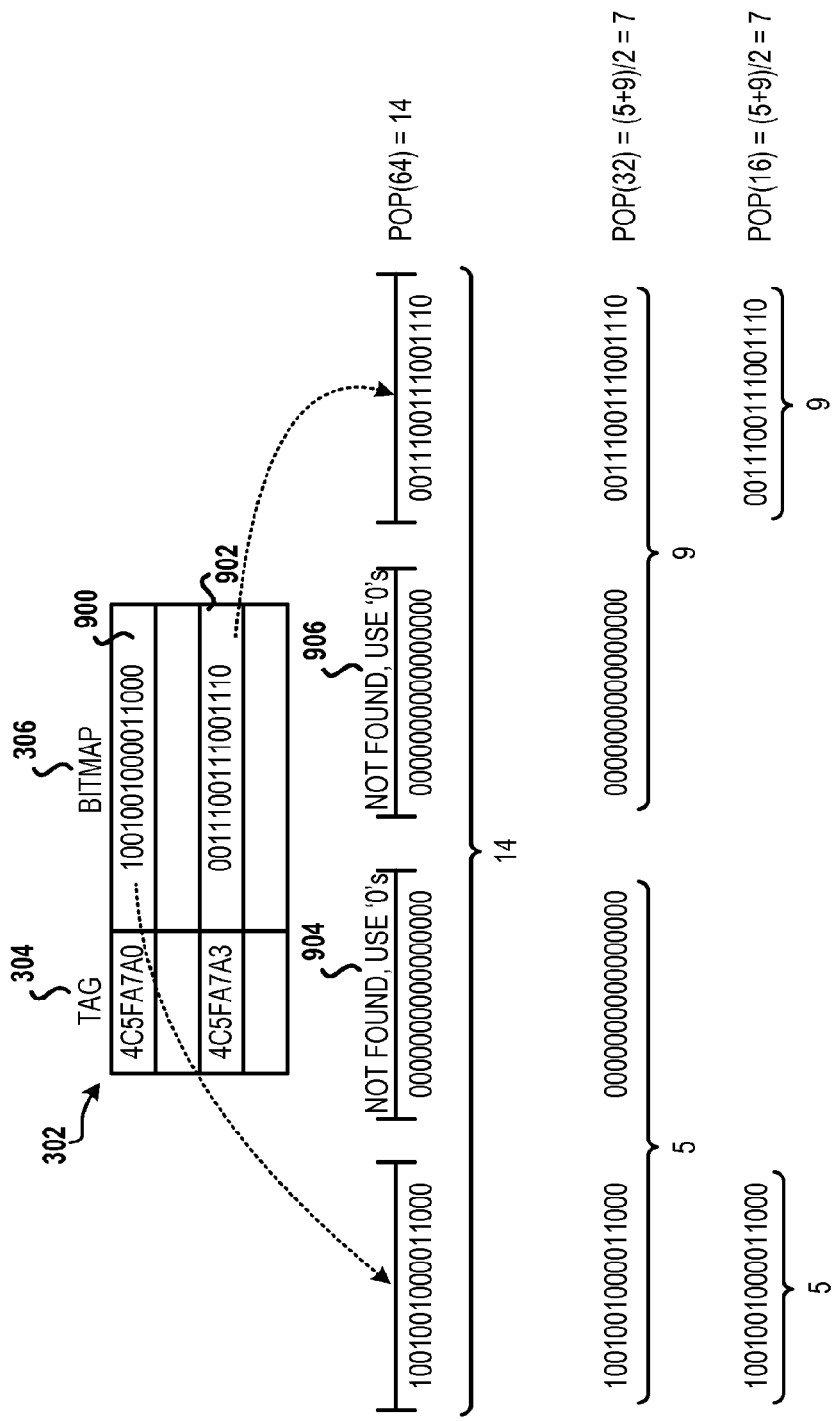
FIG. 9 is a diagram illustrating an example sampling of a population count function.

FIG. 9 is a diagram illustrating an example sampling of a popcount function, pop(x), arranged according to at least some embodiments presented herein. In particular, FIG. 9 shows an example of how the aggregation table 302 may be used to statistically estimate the popcount function, pop(x), to determine the average popcount of a bitmap of granularity x. The illustrated aggregation table 302 contains a first subregion 900 and a second subregion 902. The first subregion 900 corresponds to the tag 4C5FA7A0 that belongs in a 4 KB region. The second subregion 902 corresponds to the tag 4C5FA7A3 that also belongs in the 4 KB region. Example granularity units of 16 blocks, 32 blocks, and 64 blocks are utilized in the example below in consideration of a decision regarding which granularity unit size to select.

To compute the average popcount of a bitmap of granularity 64 (e.g., pop(64)), the bitmap of the first subregion 900 and the bitmap of the second subregion 902 may be evaluated. The bitmap of the first subregion 900 is the 16-bit string "1001001000011000." The bitmap of the second subregion 902 is the 16-bit string "0011100111001110." As in the illustrated example, a third subregion 904 and a fourth subregion 906 may each be filled with a 16-bit string "0000000000000000" because the third subregion 904 and the fourth subregion 906 possibly will not contain any eviction information but may contribute to traffic when four subregions are aggregated into one eviction message. The popcount for the entire 64-bit string is 14. That is, the 16-bit string of the first subregion 900 contains five "1" values; the 16-bit string of the second subregion 902 contains nine "1" values; the 16-bit of the third subregion 904 contains zero "1" values; and the 16-bit string of the fourth subregion 906 contains zero "1" values. The sum of the five "1" values of the first subregion 900, the nine "1" values of the second subregion 902, and the zero "1" values of both the third subregion 904 and the fourth subregion 906 is 14. Thus, the average popcount of a bitmap of granularity 64, pop(64), is equal to 14.

To compute the average popcount of a bitmap of granularity 32 (e.g., pop(32)), the 64-bit string evaluated above may be broken into two 32-bit strings. The left string (i.e., "1001001000011000") has a popcount of 5 because it contains five "1" values, while the right string (i.e., "0111001110011110") has a popcount of 9 because it contains nine "1" values. The sum of the five "1" values from the left string and the nine "1" values from the right string is 14. Thus, the average popcount of a bitmap of granularity 32, pop(32), is equal to 7, or (5+9)/2=7.

To compute the average popcount of a bitmap of granularity 16 (e.g., pop(16)), the 64-bit string evaluated above may be broken into four 16-bit strings. As described above, however, two of the 16-bit strings were not found in the aggregation table 302 (i.e., the third subregion 904 and the fourth subregion 906), and so these 16-bit strings are excluded from computation. Two 16-bit strings are considered in the computation of the average popcount of a bitmap of granularity 16. The left string (i.e., "1001001000011000") has a popcount of 5 because it contains five "1" values, while the right string (i.e., "0011100111001110") has a popcount of 9. Thus, the average popcount of a bitmap of granularity 16, pop(16), is equal to 7, or (5+9)/2=7.

FIG. 10 is provided, in part, to illustrate an example of how the popcount may be used. FIG. 10 is a table 1000 illustrating sample computations for use in determining whether to use a bitmap format or a pointer format, arranged according to at least some embodiments presented herein. In particular, the table 1000 shows that when the average popcount of a bitmap of granularity x (e.g., pop(x)) (second column) is compared to a number of bits used to represent each pointer (e.g., x/lg(x)) (third column), the average popcount of a bitmap of granularity x (e.g., pop(x)) has a larger value.

In a first row 1002 of the table 1000, x is set to 16. The average popcount of a bitmap of granularity 16 is equal to 7 (e.g., as estimated above with reference to FIG. 9). The number of bits used to represent each pointer when x is set to 16 is equal to 4 (e.g., 16/4=4). Accordingly, when x is set to 16, the bitmap format may be the most traffic-conserving format.

In a second row 1004 of the table 1000, x is set to 32. The average popcount of a bitmap of granularity 32 is equal to 7 (e.g., as estimated above with reference to FIG. 9). The number of bits used to represent each pointer when x is set to 32 is equal to 6.4 (e.g., 32/5=6.4). Accordingly, when x is set to 32, the bitmap format may be the most traffic-conserving format.

In a third row 1006 of the table 1000, x is set to 64. The average popcount of a bitmap of granularity 64 is equal to 14 (e.g., as estimated above with reference to FIG. 9). The number of bits used to represent each pointer when x is set to 64 is equal to 10.7 (e.g., 64/6=10.7). Accordingly, when x is set to 64, the bitmap format may be the most traffic-conserving format.

FIG. 11 is a table 1100 illustrating sample computations for use in determining which aggregation unit granularity conserves traffic the most in an example scenario, arranged according to at least some embodiments presented herein. In particular, the table 1100 shows that when the average popcount of a bitmap of granularity y, pop(y), (second column) is compared to c/pop(x)+(x−y)/8 (third column), pop(y) has a larger value.

In a first row 1102 of the table 1100, x is set to 32 and y is set to 16. The average popcount of a bitmap of granularity 16 is equal to 7 (e.g., as estimated above with reference to FIG. 9). The value of c/pop(x)+(x−y)/8 is equal to 2.57 (e.g., 4/7+(32−16)/8=2.57). Accordingly, when x is set to 32 and y is set to 16, the most traffic-conserving granularity unit is a 16-block region.

In a second row 1104 of the table 1100, x is set to 64 and y is set to 16. The average popcount of a bitmap of granularity 16 is equal to 7 (e.g., as estimated above with reference to FIG. 9). The value of c/pop(x)+(x−y)/8 is equal to 6.29 (e.g., 4/14+(64−16)/8=6.29). Accordingly, when x is set to 64 and y is set to 16, the most traffic-conserving granularity unit is a 16-block region.

According to the examples shown in FIG. 10 and FIG. 11, it can be determined that the most traffic-conserving format is the bitmap format and the most traffic-conserving aggregation unit is a 16-block granularity unit. Thus, for the example depicted in FIG. 9 and described above, eviction message aggregation should use a 16-block region with a bitmap format.

Figure 12:
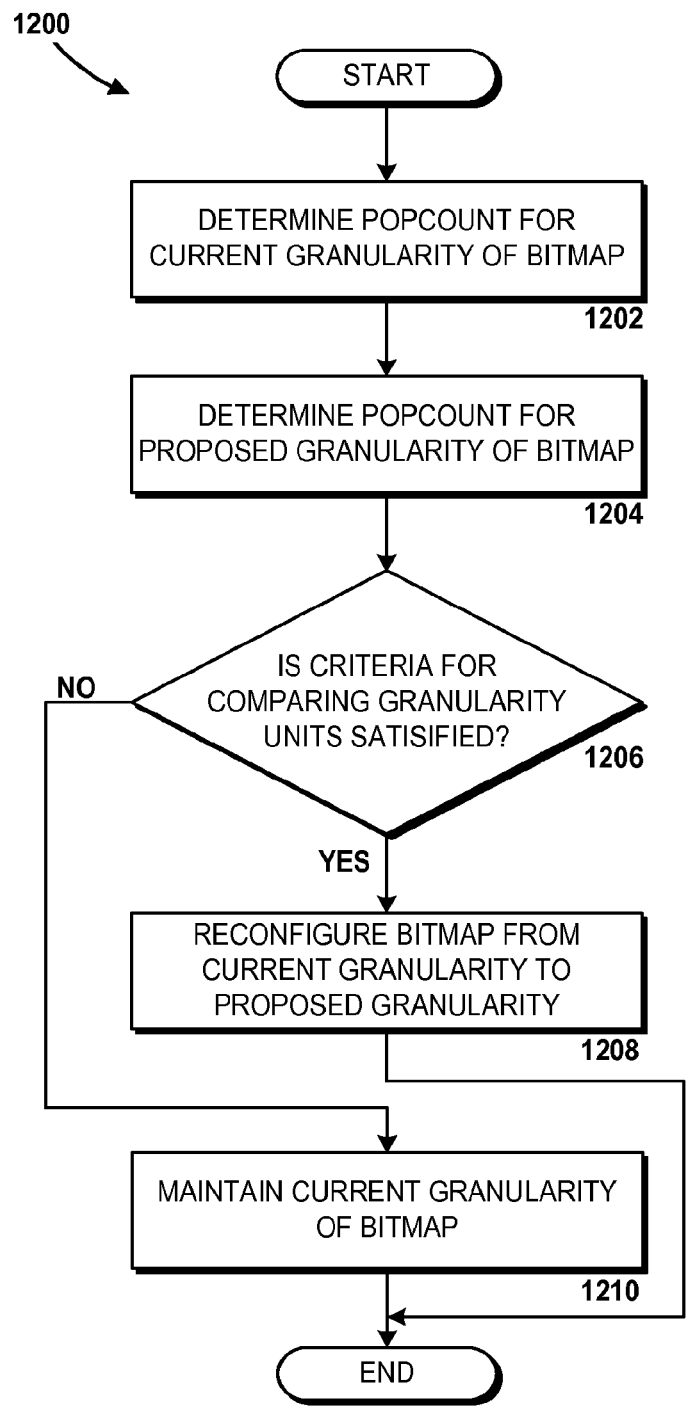
FIG. 12 is a flow diagram illustrating an example process adapted to determine an aggregation granularity unit.

FIG. 12 is a flow diagram illustrating an example process for determining an aggregation granularity unit, arranged according to at least some embodiments presented herein. The process 1200 may include various operations, functions, or actions as illustrated by one or more blocks 1202-1210.

The process 1200 may begin at block 1202 (Determine Popcount for Current Granularity of Bitmap), wherein the MAU 128 may be configured to determine a popcount for a current granularity of a bitmap. Block 1202 may be followed by block 1204.

At block 1204 (Determine Popcount for Proposed Granularity of Bitmap), the MAU 128 may be configured to determine a popcount for a proposed granularity of the bitmap. Block 1204 may be followed by block 1206.

At block 1206 (Is Criteria for Comparing Granularity Units Satisfied?), the MAU 128 may be configured to determine whether criteria for comparing the current granularity and the proposed granularity are satisfied. As described above, two granularity units, x and y, may be compared where x>y. As also described above, utilizing a larger granularity unit reduces traffic if the criteria specified in Eq. 3 are satisfied. At block 1206, the MAU 128 may be configured to determine whether the inequality specified in Eq. 3 is satisfied (i.e., whether pop(x)>c/(pop(x))+(x−y)/8). In this example, if the MAU 128 determines that the inequality specified in Eq. 3 is satisfied, then the process 1200 may proceed from block 1206 to block 1208. If, however, the MAU 128 determines that the inequality specified in Eq. 3 is not satisfied, then the process 1200 may proceed from block 1206 to block 1210.

At block 1208 (Reconfigure Bitmap from Current Granularity to Proposed Granularity), the MAU 128 may be configured to reconfigure the bitmap from the current granularity to the proposed granularity. After block 1208, the process 1200 may repeat (e.g., periodically, continuously, or on-demand) or may terminate.

At block 1210 (Maintain Current Granularity of Bitmap), the MAU 128 may be configured to maintain the current granularity of the bitmap. After block 1210, the process may repeat (e.g., periodically, continuously, or on-demand) or may terminate.

Figure 13:
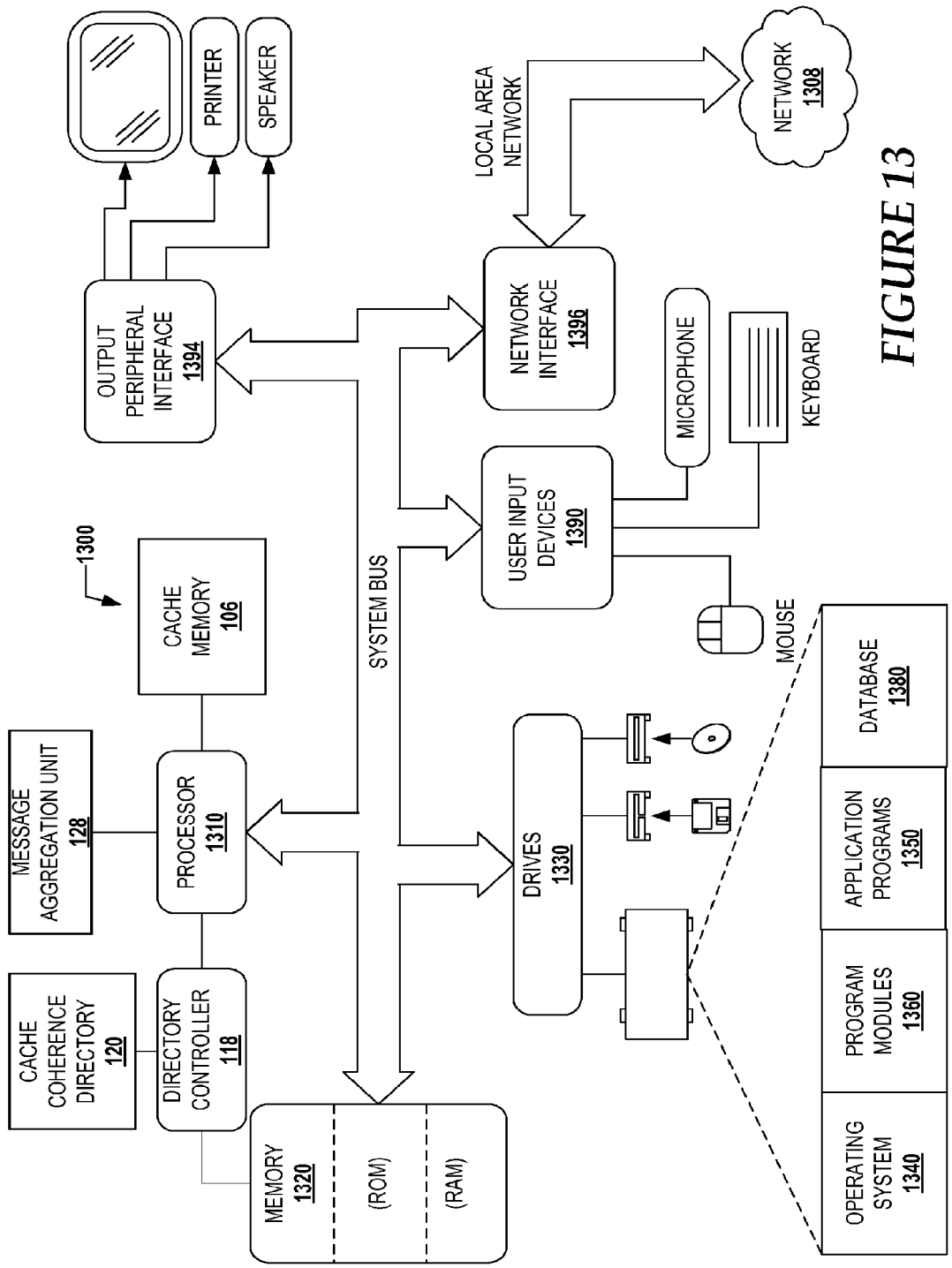
FIG. 13 is a block diagram illustrating a computer hardware architecture for an example computing device.

FIG. 13 is a block diagram illustrating a computer hardware architecture for an example computing device arranged according to at least some embodiments presented herein. As depicted, a computer 1300 includes a processor 1310, a memory 1320, and one or more drives 1330. The computer 1300 may be implemented as a conventional computer system, an embedded control computer, a laptop computer, a server computer, a mobile device, a set-top box, a kiosk, a vehicular information system, a mobile telephone, a customized machine, or other hardware platform.

The processor 1310 may be configured like the multicore chip 102 described herein above with reference to FIG. 1. In particular, the processor 1310 may include a plurality of processing cores, each of which may be operatively coupled to one or more cache memories, such as the cache memory 106. In the illustrated example, the cache memory 106, the directory controller 118, and the directory 120 may be operatively coupled to the processor 1310. Alternatively, these components may be on-chip on the processor 1310. The directory controller 118 may also be configured to communicate with the memory 1320, which may be configured like the memory 116 described herein above. The directory 120 may be implemented as a single directory or distributed across multiple directories within the processor 1310.

The drives 1330 and their associated computer storage media, provide storage of computer-readable instructions, data structures, program modules and other data for the computer 1300. The drives 1330 can include an operating system 1340, application programs 1350, program modules 1360, and a database 1380. The computer 1300 further includes user input devices 1390 through which a user may enter commands and data. The input devices 1390 can include one or more of an electronic digitizer, a microphone, a keyboard and pointing device, commonly referred to as a mouse, trackball or touch pad. Other input devices may include a joystick, game pad, satellite dish, scanner, other devices, or the like.

These and other input devices can be coupled to the processor 1310 through a user input interface that is coupled to a system bus, but may be coupled by other interface and bus structures, such as a parallel port, game port or a universal serial bus ("USB"). Computers such as the computer 1300 may also include other peripheral output devices such as speakers, printers, displays, and/or other devices, which may be coupled through an output peripheral interface 1394 or the like.

The computer 1300 may operate in a networked environment using logical connections to one or more computers, such as a remote computer (not illustrated) and/or other devices operating as part of or in communication with a network 1308 coupled to a network interface 1396. The remote computer may be a personal computer, a server computer, a router, a network PC, a peer device or other common network node, and can include many or all of the elements described above relative to the computer 1300. Networking environments are commonplace in offices, enterprise-wide area networks ("WAN"), local area networks ("LAN"), intranets, and the Internet.

When used in a LAN or WLAN networking environment, the computer 1300 may be coupled to the LAN through the network interface 1396 or an adapter. When used in a WAN networking environment, the computer 1300 typically includes a modem or other means for establishing communications over the WAN, such as the Internet or the network 1308. The WAN may include the Internet, the illustrated network 1308, various other networks, or any combination thereof. It will be appreciated that other mechanisms of establishing a communications link, ring, mesh, bus, cloud, or network between the computers may be used.

According to some embodiments, the computer 1300 may be coupled to a networking environment. The computer 1300 may include one or more instances of a physical computer-readable storage medium or media associated with the drives 1330 or other storage devices. The system bus may enable the processor 1310 to read code and/or data to/from the computer storage media. The media may represent an apparatus in the form of storage elements that are implemented using any suitable technology including, but not limited to, semiconductors, magnetic materials, optical media, electrical storage, electrochemical storage, or any other such storage technology. The media may represent components associated with memory 1320, whether characterized as RAM, ROM, flash, or other types of volatile or nonvolatile memory technology. The media may also represent secondary storage, whether implemented as the storage drives 1330 or otherwise. Hard drive implementations may be characterized as solid state, or may include rotating media storing magnetically-encoded information.

The storage media may include one or more program modules 1360. The program modules 1360 may include software instructions that, when loaded into the processor 1310 and executed, transform a general-purpose computing system into a special-purpose computing system. As detailed throughout this description, the program modules 1360 may provide various tools or techniques by which the computer 1300 may participate within the overall systems or operating environments using the components, logic flows, and/or data structures discussed herein.

The processor 1310 may be constructed from any number of transistors or other circuit elements, which may individually or collectively assume any number of states. More specifically, the processor 1310 may operate as a state machine or finite-state machine. Such a machine may be transformed to a second machine, or specific machine by loading executable instructions contained within the program modules 1360. These computer-executable instructions may transform the processor 1310 by specifying how the processor 1310 transitions between states, thereby transforming the transistors or other circuit elements constituting the processor 1310 from a first machine to a second machine. The states of either machine may also be transformed by receiving input from the one or more user input devices 1390, the network interface 1396, other peripherals, other interfaces, or one or more users or other actors. Either machine may also transform states, or various physical characteristics of various output devices such as printers, speakers, video displays, or otherwise.

Encoding the program modules 1360 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, or the like. For example, if the storage media are implemented as semiconductor-based memory, the program modules 1360 may transform the physical state of the semiconductor memory 1320 when the software is encoded therein. For example, the software may transform the state of transistors, capacitors, or other discrete circuit elements constituting the semiconductor memory 1320.

As another example, the storage media may be implemented using magnetic or optical technology such as drives 1330. In such implementations, the program modules 1360 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description. As used in the claims, the phrase "computer storage medium," and variations thereof, does not include waves, signals, and/or other transitory and/or intangible communication media, per se.

Figure 14:
FIG. 14 is a schematic diagram illustrating computer program products that include a computer program for executing a computer process on a computing device.

FIG. 14 is a schematic diagram illustrating computer program products 1400 that include a computer program for executing a computer process on a computing device, according to at least some embodiments presented herein. An illustrative embodiment of the example computer program product 1400 is provided using a signal bearing medium 1402, and may include at least one instruction 1404. The at least one instruction 1404 may include one or more instructions for detecting first evictions of a first plurality of clean blocks from a first plurality of sequential block addresses of a cache memory in a multicore chip; one or more instructions for detecting second evictions of a second plurality of clean blocks from a second plurality of sequential block addresses of the cache memory; one or more instructions for updating a first entry in an aggregation table in the multicore chip to reflect the first evictions of the first plurality of clean blocks; one or more instructions for updating a second entry in the aggregation table in the multicore chip to reflect the second evictions of the second plurality of clean blocks; one or more instructions for generating a first aggregate message configured to specify the first evictions of the first plurality of clean blocks as reflected in the first entry of the aggregation table; one or more instructions for generating a second aggregate message configured to specify the second evictions of the second plurality of clean blocks as reflected in the second entry of the aggregation table; or one or more instructions for sending the first aggregate message and the second aggregate message to a directory controller coupled to a directory in the multicore chip.

In some embodiments, the signal bearing medium 1402 of the one or more computer program products 1400 include a computer-readable medium 1406, a recordable medium 1408, and/or a communications medium 1410.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, or the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, compounds, or compositions, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," or the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method to aggregate cache eviction notifications to a directory in a multicore chip, the method comprising:
    updating, by a computing device, an aggregation table to reflect evictions of a plurality of blocks from a plurality of block addresses of at least one cache memory;
    generating, by the computing device, an aggregate message configured to specify the evictions of the plurality of blocks as reflected in the aggregation table; and
    sending the aggregate message to the directory, wherein the directory is configured to parse the aggregate message and to update a plurality of directory entries to reflect the evictions from the at least one cache memory as specified in the aggregate message.

2. The computer-implemented method of claim 1, wherein updating the aggregation table to reflect evictions of the plurality of blocks from the plurality of block addresses of the at least one cache memory comprises:

updating, by the computing device, the aggregation table to reflect evictions of one or more clean blocks from the plurality of block addresses of the at least one cache memory.

3. The computer-implemented method of claim 2, further comprising: ignoring, by the computer device, evictions of one or more dirty blocks from the plurality of block addresses of the at least one cache memory.

4. The computer-implemented method of claim 1, wherein to update the plurality of directory entries to reflect the evictions from the at least one cache memory as specified in the aggregate message, the method comprises:

detecting, by the computing device, an eviction of a block from a block address of the at least one cache memory;
determining, by the computing device, whether the aggregation table contains an entry corresponding to the block address;
in response to a determination that the aggregation table does not contain the entry corresponding to the block address, creating, by the computing device, the entry in the aggregation table and updating the entry to reflect the eviction of the block from the block address; and
in response to a determination that the aggregation table contains the entry corresponding to the block address, updating, by the computing device, the entry to reflect the eviction of the block from the block address.

5. The computer-implemented method of claim 4, wherein the entry comprises a tag portion and a bitmap portion, wherein each bit in the bitmap portion corresponds to one of a plurality of sequential block addresses;

wherein a first bit value of each bit indicates that a block has been evicted from an applicable block address in the plurality of sequential block addresses; and
wherein a second bit value of each bit indicates that the block has not been evicted from a non-applicable block address in the plurality of sequential block addresses.

6. The computer-implemented method of claim 5, wherein the tag portion comprises a portion of the applicable block address; and wherein the directory is further configured to determine the applicable block address by concatenating the tag portion with data from the bitmap portion and to update one of the plurality of directory entries to reflect eviction of the block from the applicable block address.

7. The computer-implemented method of claim 5, wherein generating the aggregate message configured to specify the evictions of the plurality of blocks as reflected in the aggregation table comprises:

retrieving, by the computing device, the tag portion and the bitmap portion from the aggregation table; and
generating, by the computing device, the aggregate message comprising the tag portion and the bitmap portion.

8. The computer-implemented method of claim 5, wherein generating the aggregate message configured to specify the evictions of the plurality of blocks as reflected in the aggregation table comprises:

retrieving, by the computing device, the tag portion and the bitmap portion from the aggregation table;
generating, by the computing device, a first aggregate message comprising the tag portion and the bitmap portion;
converting, by the computing device, the bitmap portion into a plurality of pointer values corresponding to a plurality of bits in the bitmap portion having the first bit value; and generating, by the computing device, a second aggregate message comprising the tag portion and the plurality of pointer values.

9. The computer-implemented method of claim 8, wherein the tag portion comprises a portion of the applicable block address; and wherein the directory is further configured to determine the applicable block address by concatenating the tag portion with one of the plurality of pointer values and to update one of the plurality of directory entries to reflect eviction of the block from the applicable block address.

10. The computer-implemented method of claim 8, wherein sending the aggregate message to the directory comprises:

determining, by the computing device whether the first aggregate message has a smaller data size than the second aggregate message;
in response to a determination that the first aggregate message has the smaller data size than the second aggregate message, sending the first aggregate message to the directory, wherein the directory is configured to parse the first aggregate message and to update the plurality of directory entries to reflect the evictions from the at least one cache memory as specified in the first aggregate message; and
in response to a determination that the first aggregate message does not have the smaller data size than the second aggregate message, sending the second aggregate message to the directory, wherein the directory is configured to parse the second aggregate message and to update the plurality of directory entries to reflect the evictions from the at least one cache memory as specified in the second aggregate message.

11. The computer-implemented method of claim 5, further comprising:

determining, by the computing device, a popcount for a current granularity of the bitmap portion;
determining, by the computing device, a popcount for a proposed granularity of the bitmap portion; and
determining, by the computing device and based on the popcounts, whether criteria to compare the current granularity and the proposed granularity is satisfied.

12. The computer-implemented method of claim 11, wherein:

determining, by the computing device, the popcount for the current granularity of the bitmap portion comprises determining a popcount, pop(x), for a current granularity, x, of the bitmap portion;
determining, by the computing device, the pop count for the proposed granularity of the bitmap portion comprises determining a popcount, pop(y), for a proposed granularity, y, of the bitmap portion; and
determining, by the computing device, whether the criteria to compare the current granularity and the proposed granularity is satisfied comprises determining whether an inequality $$pop(y) > \frac{c}{pop(x)} + \frac{x-y}{8}$$

is satisfied, wherein c is a constant that represents a size of a root and additional bits used for a packet header and error correction/detection code.

13. The computer-implemented method of claim 12, further comprising:

in response to a determination that the inequality $$pop(y) > \frac{c}{pop(x)} + \frac{x-y}{8}$$

is satisfied, reconfiguring, by the computing device, the bitmap portion from the current granularity to the proposed granularity.

14. The computer-implemented method of claim 12, further comprising:
in response to a determination that the inequality $$pop(y) > \frac{c}{pop(x)} + \frac{x-y}{8}$$

is not satisfied, maintaining, by the computing device, the current granularity of the bitmap portion.

15. A multicore chip, comprising:
a plurality of cores;
a cache memory coupled to the plurality of cores;
a directory and a directory controller coupled to the directory and to the cache memory;
an aggregation table comprising a plurality of entries; and
a control logic coupled to the aggregation table, the cache memory, and the directory controller, and configured to:
update the aggregation table to reflect evictions of a plurality of blocks from a plurality of block addresses of the cache memory;
generate an aggregate message configured to specify the evictions of the plurality of blocks as reflected in the aggregation table; and
send the aggregate message to the directory controller, wherein the directory controller is configured to parse the aggregate message and to update a plurality of directory entries in the directory to reflect the evictions from the cache memory as specified in the aggregate message.

16. The multicore chip of claim 15, wherein to update the aggregation table to reflect evictions of the plurality of blocks from the plurality of block addresses of the cache memory, the control logic is configured to:
update the aggregation table to reflect evictions of one or more clean blocks from the plurality of block addresses of the cache memory.

17. The multicore chip of claim 16, wherein the control logic is further configured to:
ignore evictions of one or more dirty non-clean blocks from the plurality of block addresses of the cache memory.

18. The multicore chip of claim 15, wherein to update the plurality of directory entries in the directory to reflect the evictions from the cache memory as specified in the aggregate message, the control logic is configured to:
detect an eviction of a block from a block address of the cache memory;
determine whether the aggregation table contains an entry corresponding to the block address;
in response to a determination that the aggregation table does not contain the entry corresponding to the block address, create the entry in the aggregation table and update the entry to reflect the eviction of the block from the block address; and in response to a determination that the aggregation table contains the entry corresponding to the block address, update the entry to reflect the eviction of the block from the block address.

19. The multicore chip of claim 18, wherein the entry comprises a tag portion and a bitmap portion, wherein each bit in the bitmap portion corresponds to one of a plurality of sequential block addresses;
wherein a first bit value of each bit indicates that a block has been evicted from an applicable block address in the plurality of sequential block addresses; and
wherein a second bit value of each bit indicates that the block has not been evicted from a non-applicable block address in the plurality of sequential block addresses.

20. The multicore chip of claim 19, wherein the tag portion comprises a portion of the applicable block address; and
wherein the directory controller is further configured to determine the applicable block address by concatenation of the tag portion with data from the bitmap portion and to update one of the plurality of directory entries to reflect eviction of the block from the applicable block address.

21. The multicore chip of claim 19, wherein to generate the aggregate message configured to specify the evictions of the plurality of blocks as reflected in the aggregation table, the control logic is configured to:
retrieve the tag portion and the bitmap portion from the aggregation table; and
generate the aggregate message comprising the tag portion and the bitmap portion.

22. The multicore chip of claim 19, wherein to generate the aggregate message configured to specify the evictions of the plurality of blocks as reflected in the aggregation table, the control logic is configured to:
retrieve the tag portion and the bitmap portion from the aggregation table;
generate a first aggregate message comprising the tag portion and the bitmap portion;
convert the bitmap portion into a plurality of pointer values corresponding to a plurality of bits in the bitmap portion having the first bit value; and
generate a second aggregate message comprising the tag portion and the plurality of pointer values.

23. The multicore chip of claim 22, wherein the tag portion comprises a portion of the applicable block address; and
wherein the directory controller is further configured to determine the applicable block address by concatenation of the tag portion with one of the plurality of pointer values and to update one of the plurality of directory entries to reflect eviction of the block from the applicable block address.

24. The multicore chip of claim 22, wherein to send the aggregate message to the directory controller, the control logic is configured to:
determine whether the first aggregate message has a smaller data size than the second aggregate message;
in response to a determination that the first aggregate message has the smaller data size than the second aggregate message, send the first aggregate message to the directory, wherein the directory controller is configured to parse the first aggregate message and to update the plurality of directory entries to reflect the evictions from the cache memory as specified in the first aggregate message; and
in response to a determination that the first aggregate message does not have the smaller data size than the second aggregate message, send the second aggregate message to the directory, wherein the directory controller is configured to parse the second aggregate message and to update the plurality of directory entries to reflect the evictions from the cache memory as specified in the second aggregate message.

25. The multicore chip of claim 19, wherein the control logic is configured to:
   determine a popcount for a current granularity of the bitmap portion;
   determine a popcount for a proposed granularity of the bitmap portion; and
   determine, based on the popcounts, whether criteria to compare the current granularity and the proposed granularity is satisfied.

26. The multicore chip of claim 25, wherein:
   to determine the popcount for the current granularity of the bitmap portion, the control logic is configured to determine a popcount, pop(x), for a current granularity, x, of the bitmap portion;
   to determine the popcount for the proposed granularity of the bitmap portion, the control logic is configured to determine a popcount, pop(y), for a proposed granularity, y, of the bitmap portion; and
   to determine whether the criteria to compare the current granularity and the proposed granularity is satisfied, the control logic is configured to determine whether an inequality $$pop(y) > \frac{c}{pop(x)} + \frac{x-y}{8}$$

is satisfied, wherein c is a constant that represents a size of a root and additional bits used for a packet header and error correction/detection mode.

27. The multicore chip of claim 26, wherein the control logic is further configured to reconfigure the bitmap portion from the current granularity to the proposed granularity in response to a determination that the inequality $$pop(y) > \frac{c}{pop(x)} + \frac{x-y}{8}$$

is satisfied.

28. The multicore chip of claim 26, wherein the control logic is further configured to maintain the current granularity of the bitmap portion in response to a determination that the inequality $$pop(y) > \frac{c}{pop(x)} + \frac{x-y}{8}$$

is not satisfied.

29. A non-transitory computer-readable medium having computer-executable instructions stored thereon which, in response to execution by a computer, cause the computer to:
   detect first evictions of a first plurality of clean blocks from a first plurality of sequential block addresses of a cache memory in a multicore chip;
   detect second evictions of a second plurality of clean blocks from a second plurality of sequential block addresses of the cache memory;
   update a first entry in an aggregation table in the multicore chip to reflect the first evictions of the first plurality of clean blocks, wherein the first entry corresponds to the first plurality of sequential block addresses;
   update a second entry in the aggregation table in the multicore chip to reflect the second evictions of the second plurality of clean blocks, wherein the second entry corresponds to the second plurality of sequential block addresses;
   generate a first aggregate message configured to specify the first evictions of the first plurality of clean blocks as reflected in the first entry of the aggregation table;
   generate a second aggregate message configured to specify the second evictions of the second plurality of clean blocks as reflected in the second entry of the aggregation table; and
   send the first aggregate message and the second aggregate message to a directory controller coupled to a directory in the multicore chip, wherein the directory controller is configured to parse the first aggregate message and the second aggregate message, to update a first plurality of directory entries in the directory to reflect the first evictions from the cache memory as specified in the first aggregate message, and to update a second plurality of directory entries in the directory to reflect the second evictions from the cache memory as specified in the second aggregate message.

30. The non-transitory computer-readable medium of claim 29, wherein the first entry comprises a tag portion and a bitmap portion, wherein each bit in the bitmap portion corresponds to one of the first plurality of sequential block addresses; wherein a first bit value of each bit indicates that a clean block has been evicted from an applicable block address in the first plurality of sequential block addresses; and wherein a second bit value of each bit indicates that the clean block has not been evicted from a non-applicable block address in the first plurality of sequential block addresses.

31. The non-transitory computer-readable medium of claim 30, wherein the tag portion comprises a portion of the applicable block address; and wherein the directory controller is further configured to determine the applicable block address by concatenation of the tag portion with data from the bitmap portion and to update one of the first plurality of directory entries to reflect eviction of the clean block from the applicable block address.

32. A computer-implemented method to handle cache evictions, the method comprising:
   determining, by the computing device, that a block is to be evicted from a cache memory;
   determining, by the computing device, whether the block is a dirty block;
   in response to a determination that the block is a dirty block, notifying, by the computing device, a cache coherence directory of an eviction of the block as a dirty block;
   in response to a determination that the block is not a dirty block, determining, by the computing device, whether an aggregation table contains an entry corresponding to a block address of the block;
   in response to a determination that the aggregation table does not contain an entry corresponding to the block address of the block, creating, by the computing device, an entry in the aggregation table corresponding to the block address of the block and updating the entry to reflect an eviction of the block from the cache memory as a clean block; and in response to a determination that the aggregation table does contain the entry corresponding to the block address of the block, updating, by the computing device, the entry to reflect the eviction of the block from the cache memory as the clean block.

33. The computer-implemented method of claim 32, further comprising:
generating, by the computing device, an aggregate message configured to specify a plurality of evictions of a plurality of blocks from the cache memory, wherein the plurality of evictions includes the eviction of the block; and sending the aggregate message to the cache coherence directory, wherein the cache coherence directory is configured to parse the aggregate message and to update a plurality of directory entries to reflect the plurality of evictions from the cache memory as specified in the aggregate message.

* * * * *

UNITED STATES PATENT AND TRADEMARK OFFICE
CERTIFICATE OF CORRECTION

| | | |
|---|---|---|
| PATENT NO. | : 9,158,689 B2 | Page 1 of 1 |
| APPLICATION NO. | : 13/982607 | |
| DATED | : October 13, 2015 | |
| INVENTOR(S) | : Solihin | |

It is certified that error appears in the above-identified patent and that said Letters Patent is hereby corrected as shown below:

IN THE SPECIFICATION

In Column 1, Lines 7-8, delete "under 35 U.S.C. 371" and insert -- under 35 U.S.C. § 371 --, therefor.

In Column 5, Line 46, delete "core 1040" and insert -- core 104C --, therefor.

In Column 5, Line 47, delete "node 1070." and insert -- node 107C. --, therefor.

IN THE CLAIMS

In Column 26, Line 15, in Claim 10, delete "device whether" and insert -- device, whether --, therefor.

In Column 26, Line 49, in Claim 12, delete "pop count" and insert -- popcount --, therefor.

In Column 29, Line 37, in Claim 26, delete "mode." and insert -- code. --, therefor.

In Column 30, Line 49, in Claim 32, delete "the computing" and insert -- a computing --, therefor.

Signed and Sealed this
First Day of March, 2016

Michelle K. Lee
*Director of the United States Patent and Trademark Office*